US009832813B2

(12) United States Patent
Suzuki et al.

(10) Patent No.: US 9,832,813 B2
(45) Date of Patent: Nov. 28, 2017

(54) COMMUNICATION SYSTEM, COMMUNICATION TIMING CONTROL APPARATUS, CONNECTION CONTROL APPARATUS, COMMUNICATION TIMING CONTROL METHOD, AND COMPUTER READABLE MEDIUM

(71) Applicant: NEC CORPORATION, Tokyo (JP)

(72) Inventors: Takaaki Suzuki, Tokyo (JP); Takanori Iwai, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 14/891,183

(22) PCT Filed: Dec. 26, 2013

(86) PCT No.: PCT/JP2013/007610
§ 371 (c)(1),
(2) Date: Nov. 13, 2015

(87) PCT Pub. No.: WO2014/184835
PCT Pub. Date: Nov. 20, 2014

(65) Prior Publication Data
US 2016/0119972 A1 Apr. 28, 2016

(30) Foreign Application Priority Data

May 15, 2013 (JP) ................................. 2013-103218

(51) Int. Cl.
*H04B 7/00* (2006.01)
*H04W 76/06* (2009.01)
(Continued)

(52) U.S. Cl.
CPC ......... *H04W 76/068* (2013.01); *H04W 4/005* (2013.01); *H04W 76/02* (2013.01); *H04W 8/04* (2013.01)

(58) Field of Classification Search
None
See application file for complete search history.

(56) References Cited

U.S. PATENT DOCUMENTS

2009/0180414 A1* 7/2009 Maeda ................. H04B 7/2643
370/311
2009/0201939 A1* 8/2009 Yamamoto .......... H04L 41/0803
370/401
(Continued)

FOREIGN PATENT DOCUMENTS

| EP | 2385734 A1 | 11/2011 |
| JP | 2009-065352 A | 3/2009 |
| JP | 2011-109339 A | 6/2011 |

OTHER PUBLICATIONS

Kenji Hori et al., "M2M Area Network," The Journal of the Institute of Electronics, Information and Communication Engineers, May 1, 2013, pp. 324-329, vol. 96, No. 5.
(Continued)

*Primary Examiner* — Mohammed Rachedine
(74) *Attorney, Agent, or Firm* — Sughrue Mion, PLLC

(57) ABSTRACT

An exemplary object of the present invention is to provide a communication system capable of efficiently and equally allocating communication opportunities. A communication system according to the present invention includes: a connection control apparatus (20) that allows, when a connection request message that requests a connection to a network (40) received from a communication apparatus (10) included in a plurality of communication apparatuses in which a synchronous communication is limited corresponds to a message that requests a temporary communication, the communication apparatus (10) to be temporarily connected to the network (40); and a communication timing control apparatus (30) that transmits a communication allowable timing notification message indicating a communication timing to the communication apparatus (10) while the communication apparatus (10) is allowed to be temporarily connected to the network (40).

22 Claims, 12 Drawing Sheets

(51) Int. Cl.
*H04W 76/02* (2009.01)
*H04W 4/00* (2009.01)
*H04W 8/04* (2009.01)

(56) References Cited

U.S. PATENT DOCUMENTS

2011/0212742 A1* 9/2011 Chen .................. H04W 76/048
455/507
2012/0252517 A1 10/2012 Karampatsis et al.

OTHER PUBLICATIONS

3GPP TS 22.368 V11.3.0 (Sep. 2011) 3rd Generation Partnership Project; Technical Specification Group Services and System Aspects; Service requirements for Machine-Type Communications (MTC); Stage 1 (Release 11), pp. 1-24, Sep. 2011.
International Search Report of PCT/JP2013/007610 dated Mar. 25, 2014.
Communication dated Nov. 23, 2016, from the European Patent Office in counterpart European Application No. 13884808.0.
Paiva, R. C. D. et al. "Overload control method for synchronized MTC traffic in GERAN" Vehicular Technology Conference; 2011 IEEE, XP032029707; Sep. 5, 2011 (5 pages total).
"3rd Generation Partnership Project; Technical Specification Group Services and System Aspects; System Improvements for Machine-Type Communications (MTC) (Release 11)" 3GPP TR 23.888 V11.0.0 (Sep. 2012) Technical Report (165 pages total).

* cited by examiner

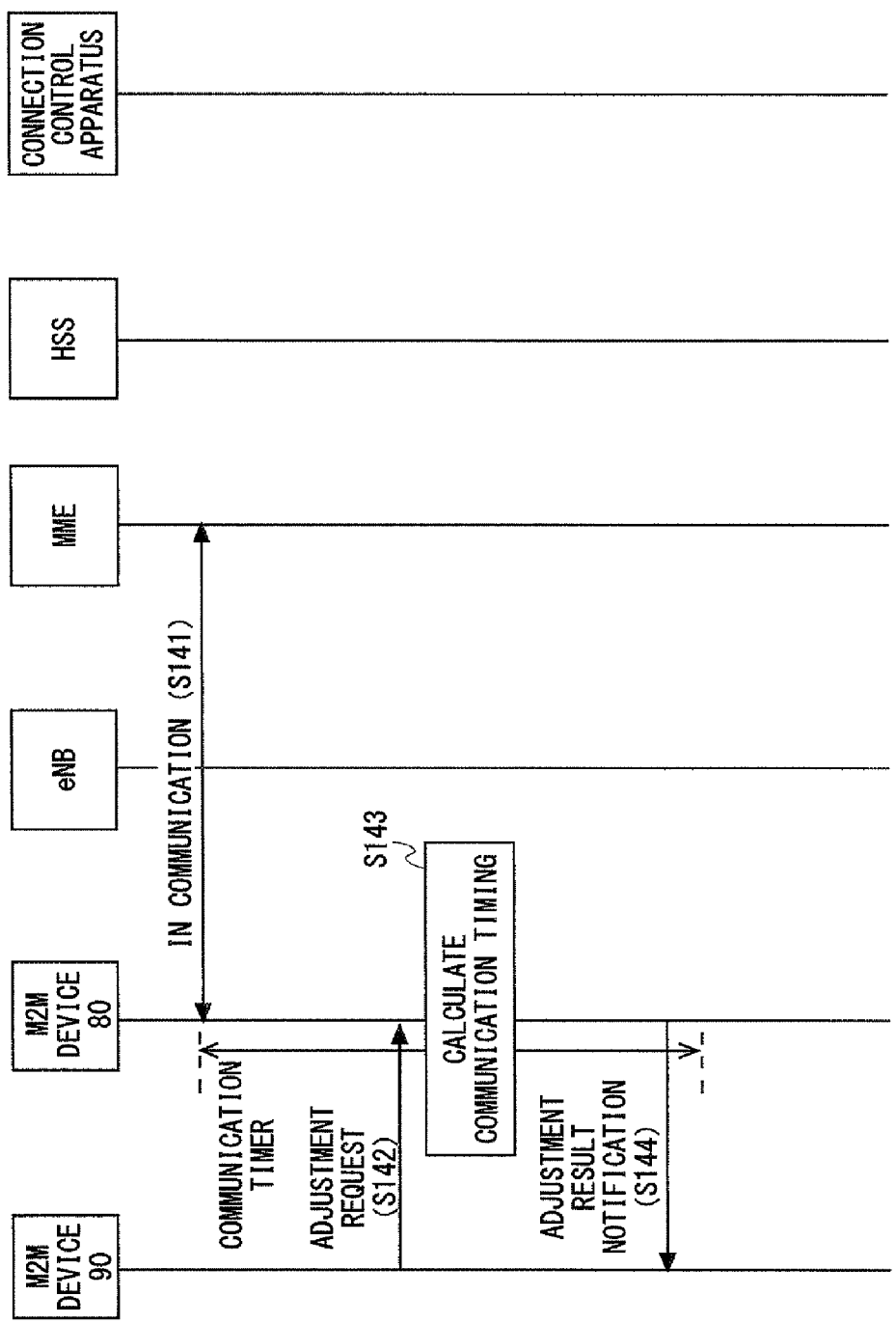

COMMUNICATION SYSTEM, COMMUNICATION TIMING CONTROL APPARATUS, CONNECTION CONTROL APPARATUS, COMMUNICATION TIMING CONTROL METHOD, AND COMPUTER READABLE MEDIUM

CROSS REFERENCE TO RELATED APPLICATIONS

This is a National Stage of International Application No. PCT/JP2013/007610 filed Dec. 26, 2013, claiming priority based on Japanese Patent Application No. 2013-103218 filed May 15, 2013, the contents of all of which are incorporated herein by reference in their entirety.

TECHNICAL FIELD

The present invention relates to a communication system, a communication timing control apparatus, a connection control apparatus, a communication timing control method, and a program, and relates to, for example, a communication system, a communication timing control apparatus, a connection control apparatus, a communication timing control method, and a program that notify a plurality of communication apparatuses where a synchronous communication is limited of communication timings.

BACKGROUND ART

In recent years, various types of communication terminals such as personal computers, mobile telephones, and smartphones have been used, and a user who owns a plurality of communication terminals generally uses each of them separately according to the purpose of its use. In such a case, the user needs to make a contract for using a communication line for each communication terminal. For example, a user who owns a mobile telephone and a smartphone needs to make a contract with a communication provider to use the communication line for each communication terminal. Therefore, the amount of the contract fee for using the communication line increases as the number of communication terminals owned by the user increases. Further, if a Machine to Machine (M2M) communication spreads in the future, the number of M2M devices managed by one company or one group would increase, and thus the amount of the contract fee for using the communication line, which is required for each M2M device to be managed, also increases.

For example, Non-Patent Literature 1 defined by the 3GPP, which is a standardization organization regarding a mobile communication network, discloses a network configuration for performing communication using a Machine Type Communication (MTC) device in the mobile communication network. The MTC device corresponds to an M2M device.

One possible solution to decrease the amount of the contract fee for using the communication line imposed on the user as described above is to provide a communication service that allows the user to use a plurality of communication terminals with a contract for using a single communication line. Since such a communication service allows a plurality of users to share a single communication line, this communication service also enables communication lines to be provided for users in developing nations or the like for a low cost.

CITATION LIST

Non Patent Literature

[Non-Patent Literature 1] 3GPP TS 22.368 V11.3.0 (2011-09) 3rd Generation Partnership Project; Technical Specification Group Services and System Aspects; Service requirements for Machine-Type Communications (MTC); Stage 1 (Release 11)

SUMMARY OF INVENTION

Technical Problem

However, when the communication service is provided for the users to allow them to use the plurality of communication terminals with the contract for using the single communication line, if one communication terminal exclusively uses the line or uses the line for a long time, the opportunities for the other communication terminals or other users to communicate decreases. Further, since the number of M2M devices managed by one company or the like is large in the M2M communication, if one communication terminal exclusively uses the line or uses the line for a long time, a large number of communication terminals lose the opportunity to communicate, which increases the severity of the problem stated above.

An exemplary object of the present invention is to provide a communication system, a communication timing control apparatus, a connection control apparatus, a communication timing control method, and a program capable of allocating communication opportunities efficiently and equally to solve the aforementioned problem.

Solution to Problem

A communication system according to a first exemplary aspect of the present invention includes: a connection control apparatus that receives a connection request message that requests a connection to a network from a first communication apparatus included in a plurality of communication apparatuses in which a synchronous communication is limited and allows the first communication apparatus to be temporarily connected to the network when the connection request message corresponds to a message that request a temporary communication; and a communication timing control apparatus that transmits a communication allowable timing notification message indicating a communication timing to the first communication apparatus while the first communication apparatus is allowed to be temporarily connected to the network.

A communication apparatus according to a second exemplary aspect of the present invention includes: a controller for determining communication timings of one apparatus and another communication apparatus included in a plurality of communication apparatuses in which a synchronous communication is limited to a network; and a communication unit for notifying the other communication apparatuses of the communication timing.

A communication timing control apparatus according to a third exemplary aspect of the present invention includes: a communication unit for transmitting, when a connection control apparatus that monitors a connection state of a plurality of communication apparatuses in which a synchronous communication is limited to the network receives a connection request message that requests a connection to the network from a first communication apparatus included in the plurality of communication apparatuses in which the synchronous communication is limited and allows the first communication apparatus to be temporarily connected to the network since the connection request message corresponds to a message that requests a temporary communication, a communication allowable timing notification message indicating a communication allowable timing to the first communication apparatus while the first communication apparatus is allowed to be temporarily connected to the network.

A connection control apparatus according to a fourth exemplary aspect of the present invention includes a controller for receiving a connection request message that requests a connection to a network from a first communication apparatus included in a plurality of communication apparatuses in which a synchronous communication is limited and allowing, when a connection request message corresponds to a message that requests a temporary communication for receiving a communication allowable timing notification message indicating a communication allowable timing from a communication timing control apparatus, the first communication apparatus to be temporarily connected to the network.

A communication timing control method according to a fifth exemplary aspect of the present invention includes transmitting, when a connection control apparatus that monitors a connection state of a plurality of communication apparatuses in which a synchronous communication is limited to the network receives a connection request message that requests a connection to the network from a first communication apparatus included in the plurality of communication apparatuses in which the synchronous communication is limited and allows the first communication apparatus to be temporarily connected to the network since the connection request message corresponds to a message that requests a temporary communication,
a communication allowable timing notification message indicating a communication allowable timing to the first communication apparatus while the first communication apparatus is allowed to be temporarily connected to the network.

A connection control method according to a sixth exemplary aspect of the present invention includes: receiving a connection request message that requests a connection to a network from a first communication apparatus included in a plurality of communication apparatuses in which a synchronous communication is limited; and when the connection request message corresponds to a message that requests a temporary communication for receiving a communication allowable timing notification message indicating a communication allowable timing from a communication timing control apparatus, allowing the first communication apparatus to be temporarily connected to the network.

A program according to a seventh exemplary aspect of the present invention causes a computer to execute a step of transmitting, when a connection control apparatus that monitors a connection state of a plurality of communication apparatuses in which a synchronous communication is limited to the network receives a connection request message that requests a connection to the network from a first communication apparatus included in the plurality of communication apparatuses in which the synchronous communication is limited and allows the first communication apparatus to be temporarily connected to the network since the connection request message corresponds to a message that requests a temporary communication,
a communication allowable timing notification message indicating a communication allowable timing to the first communication apparatus while the first communication apparatus is allowed to be temporarily connected to the network.

Advantageous Effects of Invention

According to the present invention, it is possible to provide a communication system, a communication timing control apparatus, a connection control apparatus, a communication timing control method, and a program capable of allocating communication opportunities efficiently and equally.

BRIEF DESCRIPTION OF DRAWINGS

FIG. 12 is a view showing a flow of processing for sending a notification of a communication timing according to an eighth exemplary embodiment.

DESCRIPTION OF EMBODIMENTS (First Exemplary Embodiment)

Figure 1:
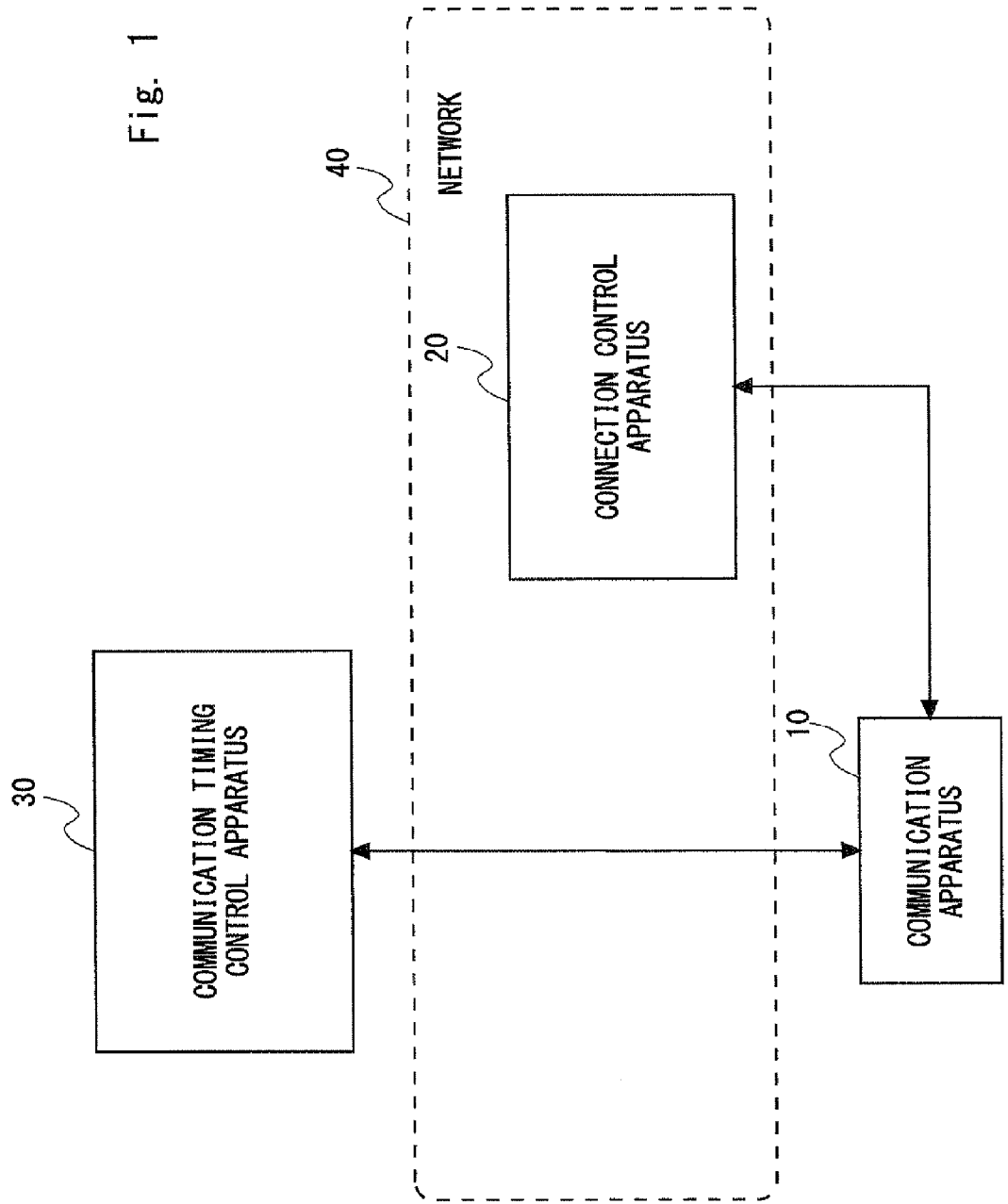
FIG. 1 is a configuration diagram of a communication system according to a first exemplary embodiment.

Hereinafter, with reference to the drawings, exemplary embodiments of the present invention will be described. First, with reference to FIG. 1, a configuration example of a communication system according to a first exemplary embodiment of the present invention will be described. The communication system shown in FIG. 1 includes a communication apparatus 10, a connection control apparatus 20, and a communication timing control apparatus 30. Further, the connection control apparatus 20 is arranged in a network 40.

The communication apparatus 10 is included in a plurality of communication apparatuses where a synchronous communication is limited. The plurality of communication apparatuses in which the synchronous communication is limited are, for example, communication apparatuses capable of performing communication using a single communication line for which there is a contract for using, in which the number of communication apparatuses that can concurrently perform communication with the contract for using the single communication line is predetermined. The number of communication apparatuses that can concurrently perform communication with the contract for using the single communication line may be one or a plurality thereof. Further, the plurality of communication apparatuses where the synchronous communication is limited may also be called a plurality of communication apparatuses that perform asynchronous communication. Further, a set of the plurality of communication apparatuses where the synchronous communication is limited may also be called an asynchronous communication group.

The communication apparatus 10 may be, for example, a mobile telephone terminal, a smartphone, a tablet terminal, a personal computer, or an M2M device.

The connection control apparatus 20 receives a connection request message that requests a connection to the network 40 from the communication apparatus 10. Further, when the connection request message received by the connection control apparatus 20 corresponds to the message that requests a temporary communication, the connection control apparatus 20 allows the communication apparatus of the communication apparatus 10 to be temporarily connected to the network 40. Further, when the total of the number of connection request messages received by the connection control apparatus 20 and the number of connections of other communication apparatuses in the asynchronous communication group is within the number of connections where the simultaneous communication is possible defined in advance in the asynchronous communication group, the connection control apparatus 20 allows the communication apparatus of the communication apparatus 10 to be connected to the network 40.

The communication apparatus 10 may transmit the connection request message to the network when, for example, a power supply of the communication apparatus 10 is turned on. Alternatively, the communication apparatus may be in a state in which it is detached from the network since the communication apparatus has not performed communication for a certain period of time and then transmit the connection request message to the network to re-start the communication.

Further, the communication apparatus 10 acquires a predetermined communication parameter from a device on the side of the network 40 in the temporary communication. The predetermined parameter may be, for example, information indicating a communication timing when the communication apparatus 10 communicates user data such as voice data, sensor data (environment observation data), image data, video data or the like.

The temporary communication is a communication that is allowed for a predetermined period of time. That is, the communication apparatus 10 is connected to the network 40 for the predetermined period of time. The state in which the communication apparatus 10 is connected to the network is a state in which the communication apparatus is allowed to perform communication through the network.

The network 40 is a network managed by a communication provider, and may be, for example, a mobile communication network (mobile network) managed by a mobile communication provider. Otherwise, the network 40 may be a network managed by a fixed communication provider.

The communication timing control apparatus 30 transmits a communication timing notification message indicating the communication timing to the communication apparatus 10 while the communication apparatus 10 is allowed to be connected to the network 40. The phase "while the communication apparatus 10 is allowed to be connected to the network 40" means the period during which the communication apparatus 10 performs a temporary communication. FIG. 1 shows an example in which the communication timing control apparatus 30 is arranged outside of the network 40. That is, FIG. 1 shows the example in which the communication timing control apparatus 30 is arranged in a network different from the connection control apparatus 20. This means that the communication timing control apparatus 30 and the connection control apparatus 20 may be managed by providers different from each other. Further, the configurations of the communication timing control apparatus 30 and the connection control apparatus 20 are not limited to the configurations shown in FIG. 1. The communication timing control apparatus 30 and the connection control apparatus 20 may be arranged in one network and managed by one provider.

As described above, by using the communication system shown in FIG. 1, even when the synchronous communication is limited in the plurality of communication apparatuses, the connection control apparatus 20 is able to allow each communication apparatus to perform the temporary communication. It is therefore possible for each communication apparatus to acquire from the communication timing control apparatus 30 a communication timing indicating the timing when the user data or the like is communicated while the temporary communication is being allowed. Accordingly, the communication is performed through the network 40 between a plurality of communication apparatuses in which a synchronous communication is limited, whereby it is possible to equally allocate the communication opportunities.

Further, the communication timing control apparatus 30 collectively manages the communication timings of the plurality of communication apparatuses, whereby the communication timing control apparatus 30 is able to efficiently calculate the communication timings of the plurality of communication apparatuses.

(Second Exemplary Embodiment)

Figure 2:
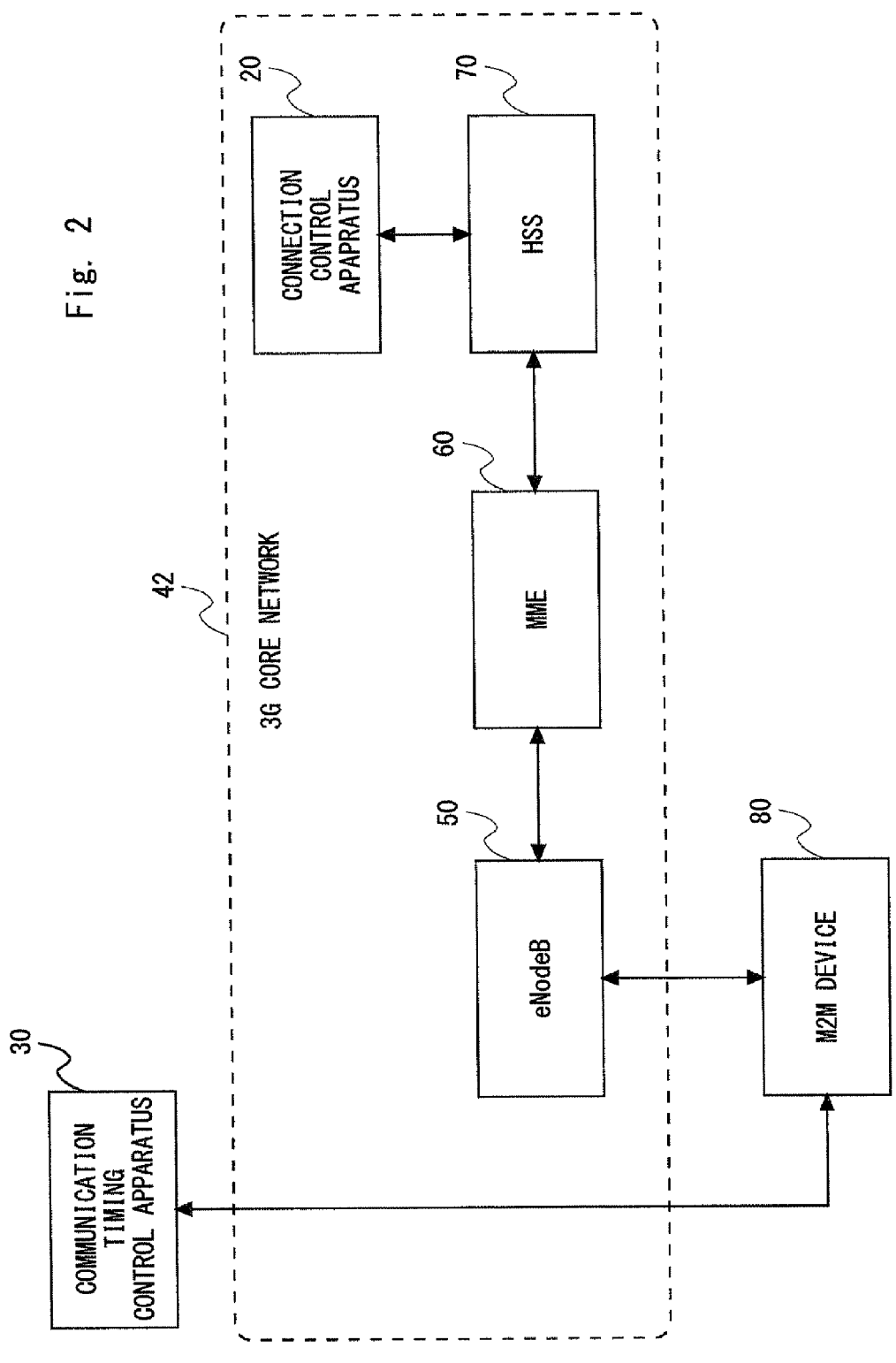
FIG. 2 is a configuration diagram of a communication system according to a second exemplary embodiment.

Next, with reference to FIG. 2, a configuration example of a communication system according to a second exemplary embodiment of the present invention will be described. In FIG. 2, a 3G core network 42 is used as the network to which the communication apparatus is connected. The 3G core network 42 is a network defined by the 3GPP and is a mobile network managed by a mobile communication provider or the like. In the 3GPP, the mobile communication terminal is defined as a User Equipment (UE). In FIG. 2, an M2M device 80 will be used as one example of the UE. While the M2M device 80 will be used as the UE in the following description, the UE is not limited to the M2M device and may be a mobile telephone terminal, a smartphone, a tablet terminal, a personal computer or the like.

Further, the M2M device 80 is a device that autonomously transmits data to a counterpart communication apparatus such as an application server without the intervention of user operations. The M2M device 80 may be, for example, an automatic vending machine having a communication function and may regularly notify the application server of the state in which products are stored. Further, the M2M device 80 is not limited to being an automatic vending machine and may instead be various other devices such as a home appliance in which a communication function is installed. Alternatively, the M2M device 80 may be a device such as a watch that is worn by a user in which a communication function is installed. In one more alternative, the M2M device 80 may be a smart meter or an environment monitoring sensor that monitors various kinds of information in which a communication function is installed.

While the description will be given hereinafter using the 3G core network 42, the network in which the connection control apparatus 20 is provided is not limited to the 3G core network 42 and may instead be, for example, a mobile network that is different from the 3G core network 42.

The 3G core network 42 includes a connection control apparatus 20, an eNodeB 50, a Mobility Management Entity (MME) 60, and a Home Subscriber Server (HSS) 70. The eNodeB 50 is a base station used in the Long Term Evolution (LTE), which is a wireless network defined by the 3GPP. The eNodeB 50 performs communication with the M2M device 80 through a radio link. The eNodeB 50 is connected with the MME 60 in the 3G core network.

The MME 60 performs mobility management of the M2M device 80. For example, the MME 60 manages a location registration area where the M2M device 80 is positioned and calls the M2M device 80 when an incoming packet call is made to the M2M device 80. The location registration area may be referred to as, for example, a Tracking Area (TA).

Further, the MME 60 transmits or receives control information in the 3G core network 42. The control information is data used to secure the communication resources for the M2M device 80 or a call connection of the M2M device 80 and is also called C (Control) plane data. The communication resources are, for example, a buffer capacity, a memory capacity or the like used for the communication of the M2M device 80. Meanwhile, data such as audio data or image data that is exchanged between the communication apparatuses is also referred to as user data or U (User) plane data. The MME 60 is connected to the eNodeB 50 and the HSS 70 in the 3G core network 42.

The HSS 70 manages subscriber information on the M2M device 80. The subscriber information on the M2M device 80 is identification information on the M2M device 80, information on the service to which the M2M device 80 subscribes, an asynchronous communication group identifier or the like, which is information on the asynchronous communication group to which each M2M device 80 belongs. The HSS 70 may execute authentication processing using the subscriber information on the M2M device 80 when the M2M device 80 is connected to the 3G core network 42. The HSS 70 is connected with the connection control apparatus 20 and the MME 60 in the 3G core network.

As described with reference to FIG. 1, when the connection request message is transmitted to the 3G core network 42 from the M2M device 80, the connection control apparatus 20 determines whether the connection request message corresponds to the message that requests the temporary communication. When it is determined that the connection request message corresponds to the message that requests the temporary communication, the connection control apparatus 20 allows the M2M device 80 to be temporarily connected to the 3G core network 42.

As described with reference to FIG. 1, while the M2M device 80 is allowed to be temporarily connected to the 3G core network 42, the communication timing control apparatus 30 transmits the communication timing notification message indicating the communication timing to the M2M device 80. Further, the communication timing control apparatus 30 controls the communication timings of the plurality of M2M devices 80 that belong to the asynchronous communication group.

Further, while the connection control apparatus 20 has been described as being an apparatus different from the MME 60 or the HSS 70 in FIG. 2, the function of the connection control apparatus 20 may be included in the functions of the MME 60 or the HSS 70. Alternatively, some of the functions of the connection control apparatus 20 may be included in the functions of the MME 60 or the HSS 70.

Figure 3:
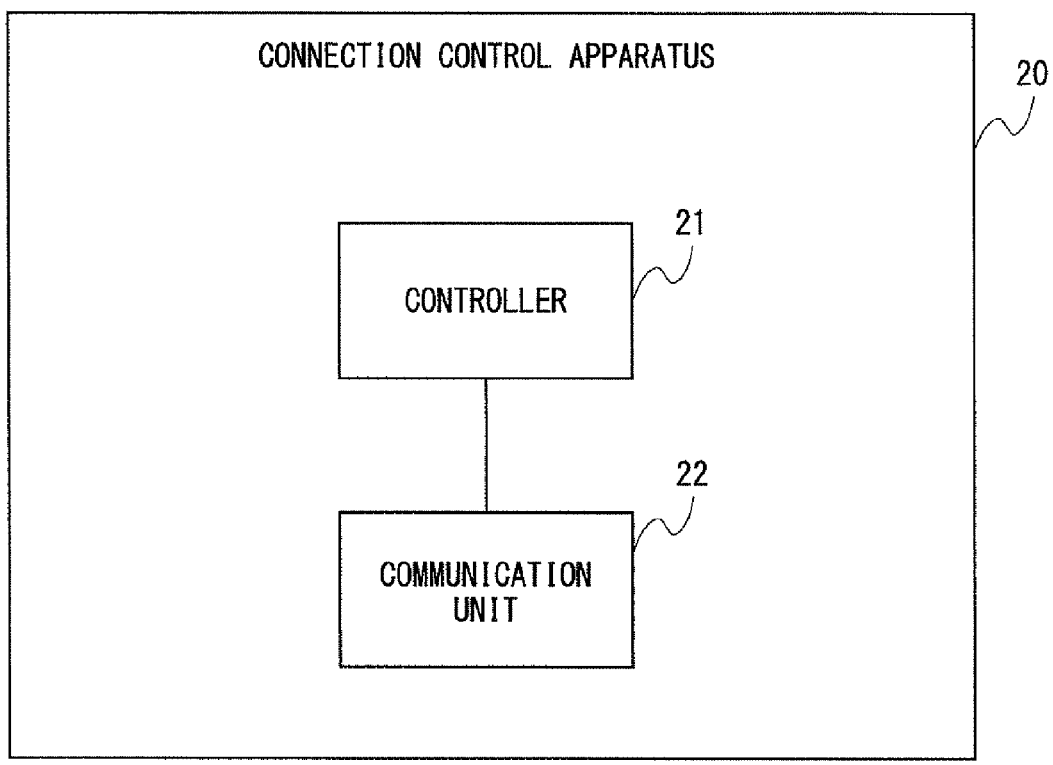
FIG. 3 is a configuration diagram of a connection control apparatus according to the second exemplary embodiment.

Next, with reference to FIG. 3, a configuration example of the connection control apparatus 20 according to the second exemplary embodiment of the present invention will be described. The connection control apparatus 20 includes a controller 21 and a communication unit 22.

The communication unit 22 receives the connection request message that requests the connection to the 3G core network 42 transmitted from one of the M2M devices in the asynchronous communication group (e.g., the M2M device 80). The communication unit 22 receives the connection request message through the HSS 70. The communication unit 22 outputs the connection request message that has been received to the controller 21. Further, when a response message in response to the connection request message has been generated in the controller 21, the communication unit 22 transmits the response message that has been generated to the HSS 70.

The controller 21 determines whether the connection request message output from the communication unit 22 corresponds to the message that requests the temporary communication. For example, when the controller 21 receives the connection request message in which a temporary communication flag has been set, the controller 21 determines that the connection request message that has been received corresponds to the message that requests the temporary communication. Alternatively, an identifier indicating that the connection request message corresponds to the message that requests the temporary communication may be set in the connection request message in place of the temporary communication flag being set in the connection request message.

Further, even when the temporary communication flag or the identifier indicating that the connection request message corresponds to the message that requests the temporary communication (it will be hereinafter referred to as a temporary communication flag or the like) has been set, if a predetermined period of time has not passed since the connection request message where the temporary communication flag or the like is set had been transmitted from the same M2M device 80 before, the controller 21 may determine that the communication that has been requested does not correspond to the temporary communication or the temporary communication will not be allowed.

Further, the controller 21 may manage a timer for each M2M device to determine whether a predetermined period of time has passed since the connection request message had been transmitted from the same M2M device before. More specifically, the controller 21 may manage information on time at which the connection request message was received before for each M2M device. Alternatively, the controller 21 may manage elapsed time information indicating time after the connection request message was received before for each M2M device.

The controller 21 generates a response message for sending a notification indicating that the temporary communication will be allowed or a response message for sending a notification indicating that the temporary communication will not be allowed according to the determination result and outputs the response message that has been generated to the communication unit 22.

Further, the controller 21 may also send a notification of time during which the temporary communication will be allowed when it sends a notification of allowance of the temporary communication using the response message. For example, when a large number of M2M devices are requesting the temporary communication, the controller 21 may shorten the time during which the temporary communication regarding which a notification is to be sent to each M2M device will be allowed. On the other hand, when the number of M2M devices that request the temporary communication is small, the controller 21 may increase the time during which the temporary communication regarding which a notification is to be sent to each M2M device will be allowed.

Figure 4:
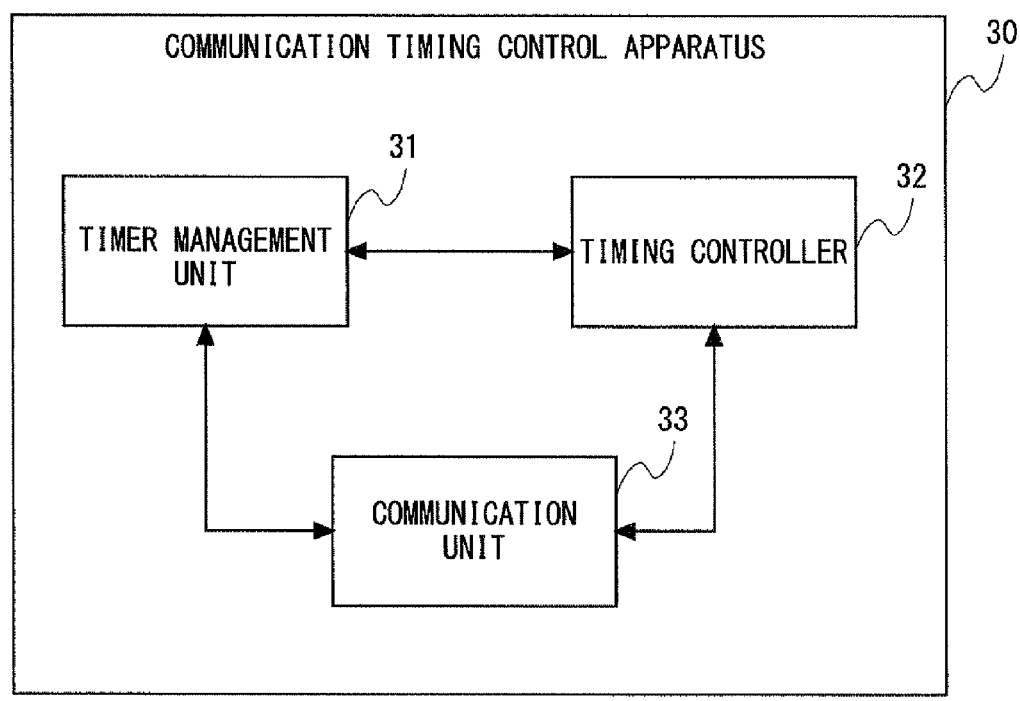
FIG. 4 is a configuration diagram of a communication timing control apparatus according to the second exemplary embodiment.

Next, with reference to FIG. 4, a configuration example of the communication timing control apparatus 30 according to the second exemplary embodiment of the present invention will be described. The communication timing control apparatus 30 includes a timer management unit 31, a timing controller 32, and a communication unit 33.

The communication unit 33 transmits the communication timing notification message indicating the communication timing to the M2M device 80 while the M2M device 80 is allowed to be temporarily connected to the 3G core network 42. The communication timing indicated in the communication timing notification message is, for example, a timing at which the M2M device 80 is connected to the 3G core network 42 to transmit or receive user data or the like.

Upon receiving a communication timing request message that requests the acquisition of the communication timing regarding which a notification has been sent from the M2M device 80, the communication unit 33 may transmit the communication timing notification message to the M2M device 80. That is, the communication unit 33 may determine, upon receiving the communication timing request message transmitted from the M2M device 80, that the M2M device 80 is allowed to be temporarily connected to the 3G core network 42.

Alternatively, the communication unit 33 may receive information indicating that the M2M device 80 has been allowed to be temporarily connected to the 3G core network 42 from the connection control apparatus 20. Upon receiving a notification from the connection control apparatus 20 that the M2M device 80 has temporarily been connected to the 3G core network 42, the communication unit 33 may transmit the communication timing notification message to the M2M device 80. At this time, the communication unit 33 may receive information regarding the time of the temporary communication allowed for the M2M device 80 from the connection control apparatus 20. The communication unit 33 may transmit the communication timing notification message to the M2M device 80 within the time of the temporary communication allowed for the M2M device 80.

Upon receiving the communication timing request message transmitted from the M2M device 80, the timer management unit 31 starts a collective accept timer. Further, upon receiving the communication timing request message transmitted from the plurality of M2M devices while the collective accept timer is being activated, the timing controller 32 calculates the communication timing regarding which a notification is to be sent to each M2M device. Therefore, the timing controller 32 is able to collectively calculate the communication timings of the plurality of M2M devices, whereby it is possible to efficiently calculate the communication timings of the M2M devices. The time period from the start of the collective accept timer to the expiration of the collective accept timer may be determined in advance or may be dynamically changed while the collective accept timer is being activated according to the number of communication timing request messages.

Further, the timing controller 32 may calculate the communication timings as follows. For example, upon receiving the communication timing request message transmitted from the M2M device 80, the timing controller 32 transmits the communication timing notification message to the M2M device 80 and starts the collective accept timer. Further, upon receiving the communication timing request message from a device other than the M2M device 80 (e.g., M2M device 90), the timing controller 32 may calculate the communication timing of the M2M device 90, transmit the communication timing notification message to the M2M device 90, and again calculate or update the communication timing of the M2M device 80.

Further, the timing controller 32 may calculate the communication time to be allocated to the M2M devices 80 and 90 as well when the communication timings of the M2M devices 80 and 90 are calculated. More specifically, when the number of UEs that have transmitted the communication timing request message while the collective accept timer is being activated is large, the timing controller 32 may shorten the communication time to be allocated to each UE. On the other hand, when the number of UEs that have transmitted the communication timing request message is small, the timing controller 32 may increase the communication time to be allocated to each UE.

Therefore, when the communication timing request message is transmitted from the M2M device 90 after the communication time to be allocated to the M2M device 80 is calculated, the timing controller 32 may update the communication time of the M2M device 80 to shorten the communication time to be allocated to the M2M device 80.

Assume another case, for example, in which the timing controller 32 assumes that it will receive the communication timing request messages from five M2M devices while the collective accept timer is being activated and calculates the communication time of the M2M device 80. When it is revealed after the calculation that the communication timing request messages have been actually transmitted from only two M2M devices while the collective accept timer is being activated, the timing controller 32 may update the communication time of the M2M device 80 to increase the communication time to be allocated to the M2M device 80.

The timing controller 32 may calculate the communication timing of the M2M device 80 and send a notification of the communication timing of the M2M device 80 even when the timing controller 32 have not acquired the information regarding the temporary communication allowed for the M2M device 80 or given to the M2M device 80 (in particular, time of the temporary communication) from the M2M device 80 or the connection control apparatus 20.

Figure 5:
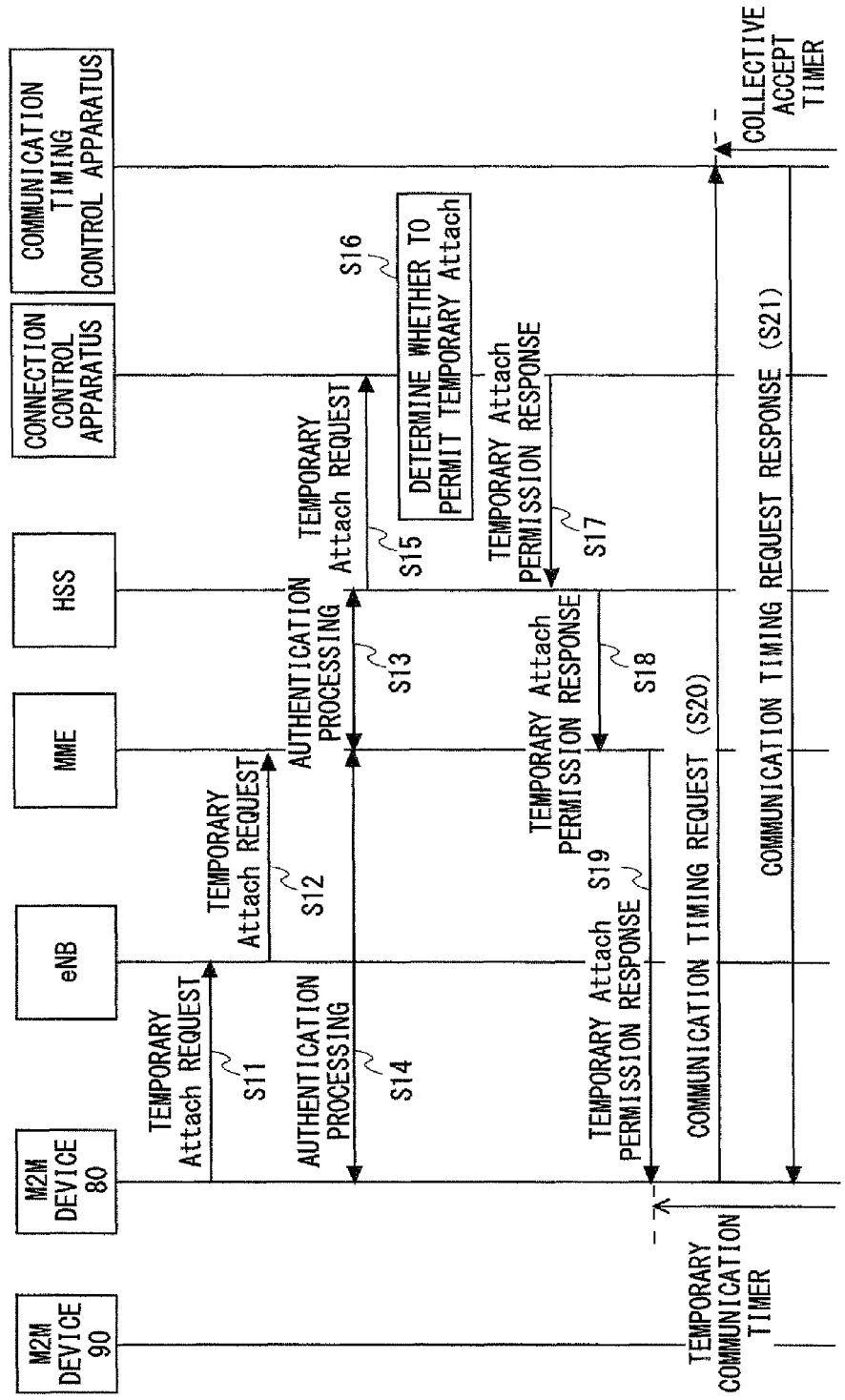
FIG. 5 is a view showing a flow of processing for connecting an M2M device to a 3G core network according to the second exemplary embodiment.

Referring next to FIG. 5, a flow of processing for connecting the M2M device 80 to the 3G core network 42 according to the second exemplary embodiment of the present invention will be described. First, the M2M device 80 transmits a temporary Attach request message to the eNodeB 50 (in FIG. 5, it is shown as eNB) (S11). The temporary Attach request message corresponds to the connection request message. The M2M device 80 transmits the temporary Attach request message to the eNodeB 50 to be connected to the 3G core network 42 when, for example, a power is turned on. The temporary Attach request message includes subscriber information regarding the M2M device 80 and the temporary communication flag. Further, the state in which the M2M device is connected to the 3G core network 42 may be referred to as an Attach state. In particular, the state in which the M2M device is connected to the 3G core network 42 to perform the temporary communication may be referred to as a temporary Attach state. Further, the state in which the M2M device is detached from the 3G core network may be referred to as a Detach state or non-Attach state.

Next, the eNodeB 50 transmits the temporary Attach request message transmitted to it from the M2M device 80 to the MME 60 (S12). Next, when the temporary Attach request message is transmitted to the MME 60 from the eNodeB 50, authentication processing is performed between the M2M device 80 and the HSS 70. Specifically, the HSS 70 communicates a message regarding the authentication processing with the M2M device 80 through the MME 60 (S13 and S14). The HSS 70 performs the processing for authenticating the M2M device 80 using the subscriber information of the M2M device 80. The authentication processing of the M2M device 80 may be processing for determining whether the subscriber information sent from the M2M device 80 coincides with the subscriber information registered in the HSS 70. The authentication processing may be processing for determining whether to allow the connection of the M2M device 80 to the 3G core network.

Next, when the authentication processing of the M2M device 80 has been completed in Steps S13 and S14, the HSS 70 transmits the temporary Attach request message to the connection control apparatus 20 (S15). Next, upon receiving the temporary Attach request message, the connection control apparatus 20 determines whether the temporary Attach request message transmitted from the M2M device 80 corresponds to the message that requests the temporary communication (S16). The connection control apparatus 20 may determine whether the temporary Attach request message corresponds to the message that requests the temporary communication according to whether the temporary communication flag has been set in the temporary Attach request message. Alternatively, the connection control apparatus 20 may determine whether the temporary Attach request message corresponds to the message that requests the temporary communication according to a transmission history of the temporary Attach request message transmitted from the M2M device 80.

Next, when it is determined that the temporary Attach request corresponds to the message that requests the temporary communication, the connection control apparatus 20 transmits the temporary Attach permission response message to the HSS 70 (S17). Next, the HSS 70 transmits a temporary Attach permission response message transmitted from the connection control apparatus 20 to the MME 60 (S18). Further, the MME 60 transmits the temporary Attach permission response message transmitted from the HSS 70 to the M2M device 80 (S19).

The connection control apparatus 20 may add information regarding the communication time when the temporary communication is permitted to the temporary Attach permission response message to be transmitted to the HSS 70. Further, since the temporary Attach permission response message transmitted from the connection control apparatus 20 is transmitted to the M2M device 80, the M2M device 80 is able to know the communication time when the temporary communication is permitted.

Next, upon receiving the temporary Attach permission response message, the M2M device 80 starts a temporary communication timer during the communication time when the temporary communication regarding which a notification has been sent by the message is permitted. Further, the M2M device 80 may be detached from the 3G core network 42 and make a transition to the Detach state upon the expiration of the temporary communication timer.

Next, the M2M device 80 transmits the communication timing request message to the communication timing control apparatus 30 while the temporary communication timer is being activated (S20). The M2M device 80 transmits the communication timing request message to the communication timing control apparatus 30 to acquire the information regarding the timing at which the user data or the like can be exchanged. Further, the M2M device 80 may also request the communication timing control apparatus 30 to acquire information regarding the communication allowable time by the communication timing request message.

The M2M device 80 may transmit the communication timing request message to the communication timing control apparatus 30 through the 3G core network 42. Alternatively, the M2M device 80 may transmit the communication timing request message to the communication timing control apparatus 30 through a network different from the 3G core network 42.

Next, the communication timing control apparatus 30 transmits a communication timing request response message to the M2M device 80 (S21). The communication timing control apparatus 30 sets a timing at which the M2M device 80 is connected (attached) to the 3G core network 42 to communicate the user data or the like in the communication timing response message and transmits the communication timing response message. Further, the communication timing control apparatus 30 may set the communication time that is allowed to exchange the user data or the like in the communication timing response message and transmits the communication timing response message.

Further, in Step S20, the communication timing control apparatus 30 receives the communication timing request message and starts the collective accept timer.

As described above, although the M2M device 80 is limited to perform communication concurrently with other M2M devices that belong to the asynchronous communication group, by executing the processing for connecting the M2M device 80 to the 3G core network 42 shown in FIG. 5, the M2M device 80 is allowed to perform the temporary communication regardless of the connection state of the other M2M devices. Therefore, the M2M device 80 is able to acquire the communication timing to exchange the user data or the like from the communication timing control apparatus 30 while the temporary communication that has been allowed is being performed.

Further, the identification information used to identify the M2M device in the connection control apparatus 20 is subscriber information of the 3G network and the identifier used to identify the M2M device in the communication timing control apparatus 30 may be a service terminal identifier different from the subscriber identifier of the 3G network. The service terminal identifier is an identifier managed in the communication timing control apparatus 30 arranged in an external network different from the 3G core network. In such a case, processing for mapping the subscriber information used in the connection control apparatus 20 and the identifier used to identify the M2M device used in the communication timing control apparatus 30 may be executed in advance between the connection control apparatus 20 or the HSS 70 and the communication timing control apparatus 30. Further, the processing for the mapping may be executed also for the M2M device identified in the identifier used by each of the connection control apparatus 20 and the communication timing control apparatus 30 and the asynchronous communication group to which the M2M device belongs.

(Third Exemplary Embodiment)

Figure 6:
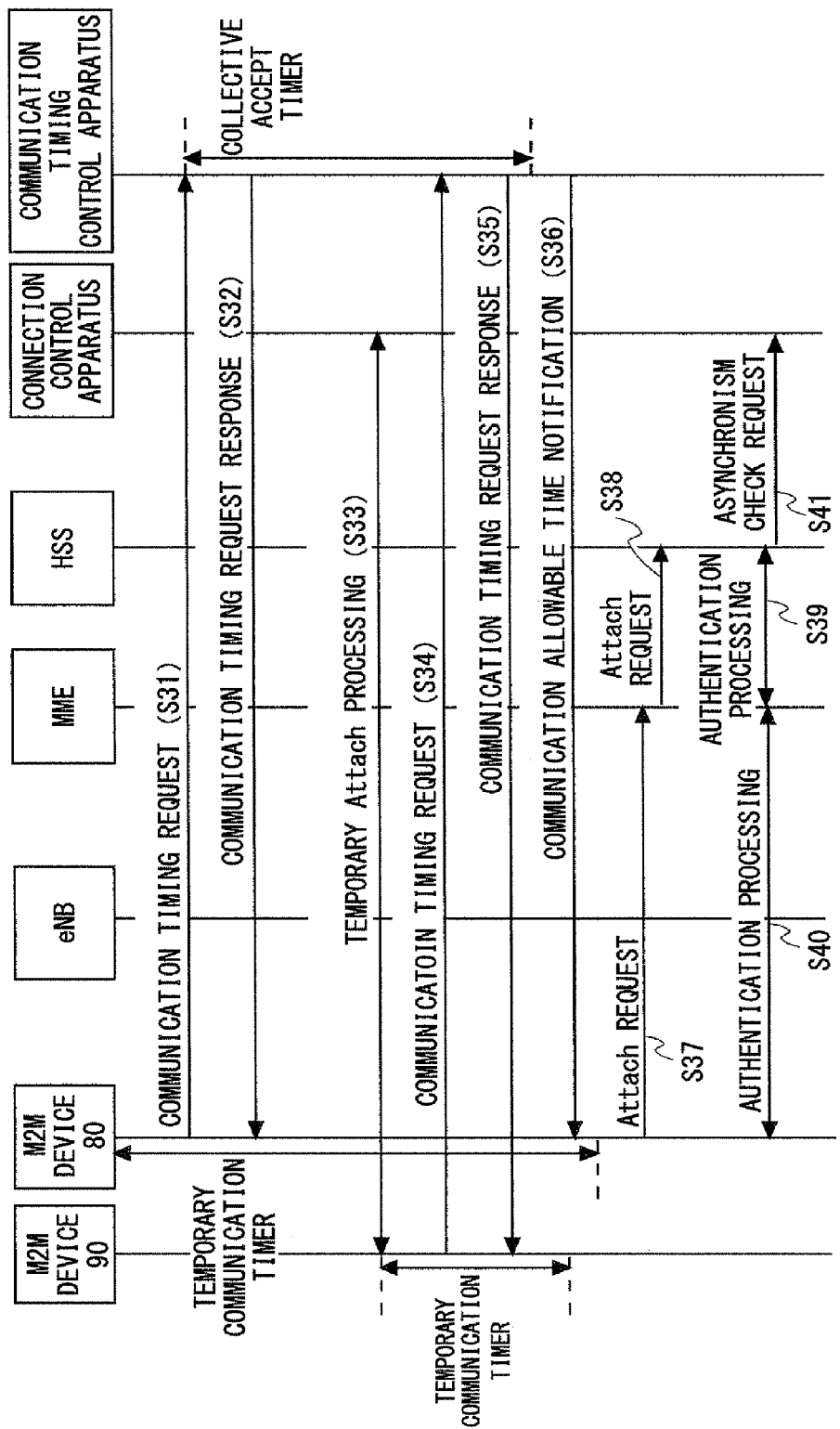
FIG. 6 is a view showing a flow of processing for connecting an M2M device to a 3G core network according to a third exemplary embodiment.

Referring next to FIG. 6, a flow of processing for connecting the M2M device to the 3G core network 42 according to a third exemplary embodiment of the present invention will be described. It is assumed in FIG. 6 that the M2M device 80 has already executed the processing of Step S19 and the preceding processing shown in FIG. 5. That is, the M2M device 80 is in the state in which it is permitted to be temporarily connected to the 3G core network 42.

First, the M2M device 80 transmits the communication timing request message to the communication timing control apparatus 30 while the temporary communication timer is being activated (S31). Next, the communication timing control apparatus 30 transmits the communication timing request response message to the M2M device 80 (S32). Since Steps S30 and S31 are similar to Steps S20 and S21 in FIG. 5, the detailed descriptions will be omitted.

Next, the M2M device 90 different from the M2M device 80 executes temporary Attach processing (S33) with the connection control apparatus 20. Since the temporary Attach processing in Step S33 is similar to that in Steps S11-S19 shown in FIG. 5, the detailed descriptions will be omitted. When the temporary Attach processing is completed, the M2M device 90 starts the temporary communication timer.

Next, the M2M device 90 transmits the communication timing request message to the communication timing control apparatus 30 while the temporary communication timer is being activated (S34). Next, the communication timing control apparatus 30 transmits the communication timing request response message to the M2M device 90 (S35). The communication timing control apparatus 30 sets a timing at which the M2M device 90 is attached to the 3G core network 42 to transmit the user data or the like in the communication timing request response message and transmits the communication timing request response message. Further, the communication timing control apparatus 30 may set the communication time to exchange the user data or the like in the communication timing response message to transmit the communication timing response message.

The communication timing control apparatus 30 accepts the communication timing request message transmitted from the M2M device 90 while the collective accept timer is being activated. In such a case, the communication timing control apparatus 30 notifies the M2M device 90 of the communication time to exchange user data or the like and the timing at which the M2M device 90 is to be attached to the 3G core network 42 and then notifies the M2M device 80 of the communication time that has been updated (S36). For example, the communication timing control apparatus 30 may perform control to shorten the communication time regarding which a notification has been sent to the M2M device 80 in Step S32 to allow the M2M device 90 which has transmitted the communication timing request message after the M2M device 80 had transmitted the communication timing request message. In such a case, in Steps S36, the communication timing control apparatus 30 notifies the M2M device 80 of the communication time shorter than the communication time regarding which a notification has been sent in Steps S32.

Next, the M2M device 80 transmits the Attach request message to the MME 60 at the Attach timing regarding which a notification has been sent in Step S36 after the expiration of the temporary communication timer (S37). It is assumed in this example that the M2M device 80 is in the state in which it is detached from the 3G core network 42 upon the expiration of the temporary communication timer. Accordingly, the M2M device 80 transmits the Attach request message to the MME 60 to be connected to the 3G core network 42.

Next, the MME 60 transmits the Attach request message to the HSS 70 (S38). Next, the authentication processing is performed between the M2M device 80 and the HSS 70. Specifically, the HSS 70 communicates the message regarding the authentication processing with the M2M device 80 through the MME 60 (S39, S40). The authentication processing in Steps S39 and S40 is similar to that in Steps S13 and S14.

Next, upon completion of the authentication processing regarding the M2M device 80, the HSS 70 transmits an asynchronism check request message to the connection control apparatus 20 (S41). The asynchronism check request message is a message used to ask the connection control apparatus 20 whether the UE or another M2M device in the asynchronous communication group to which the M2M device 80 belongs is not attached to the 3G core network 42.

Upon receiving the asynchronism check request message transmitted from the HSS 70, the connection control apparatus 20 checks whether the UE or another M2M device in the asynchronous communication group to which the M2M device 80 belongs has not been attached to the 3G core network 42.

As described above, when the communication timing control apparatus 30 receives the communication timing request messages transmitted from the plurality of M2M devices while the collective accept timer is being activated, it is possible to adjust the Attach timing regarding which a notification is to be sent or the communication time to be allocated according to the number of M2M devices whose communication timing request messages have been accepted.

For example, when the communication timing control apparatus 30 has accepted the communication timing request messages from a large number of M2M devices while the collective accept timer is being activated, it may shorten the interval of the Attach timing regarding which a notification is to be sent to each M2M device and further shorten the communication time to be allocated. Further, when the communication timing control apparatus 30 has accepted the communication timing request messages from a small number of M2M devices while the collective accept timer is being activated, the communication timing control apparatus 30 may increase the interval of the Attach timing regarding which a notification is to be sent to each M2M device compared to the case in which the communication timing control apparatus 30 has accepted the communication timing request messages from a large number of M2M devices. Further, when the communication timing control apparatus 30 has accepted the communication timing request messages from a small number of M2M devices while the collective accept timer is being activated, it may increase the communication time allocated to each M2M device compared to the case in which the communication timing control apparatus 30 has accepted the communication timing request messages from a large number of M2M devices.

(Fourth Exemplary Embodiment)

Figure 7:
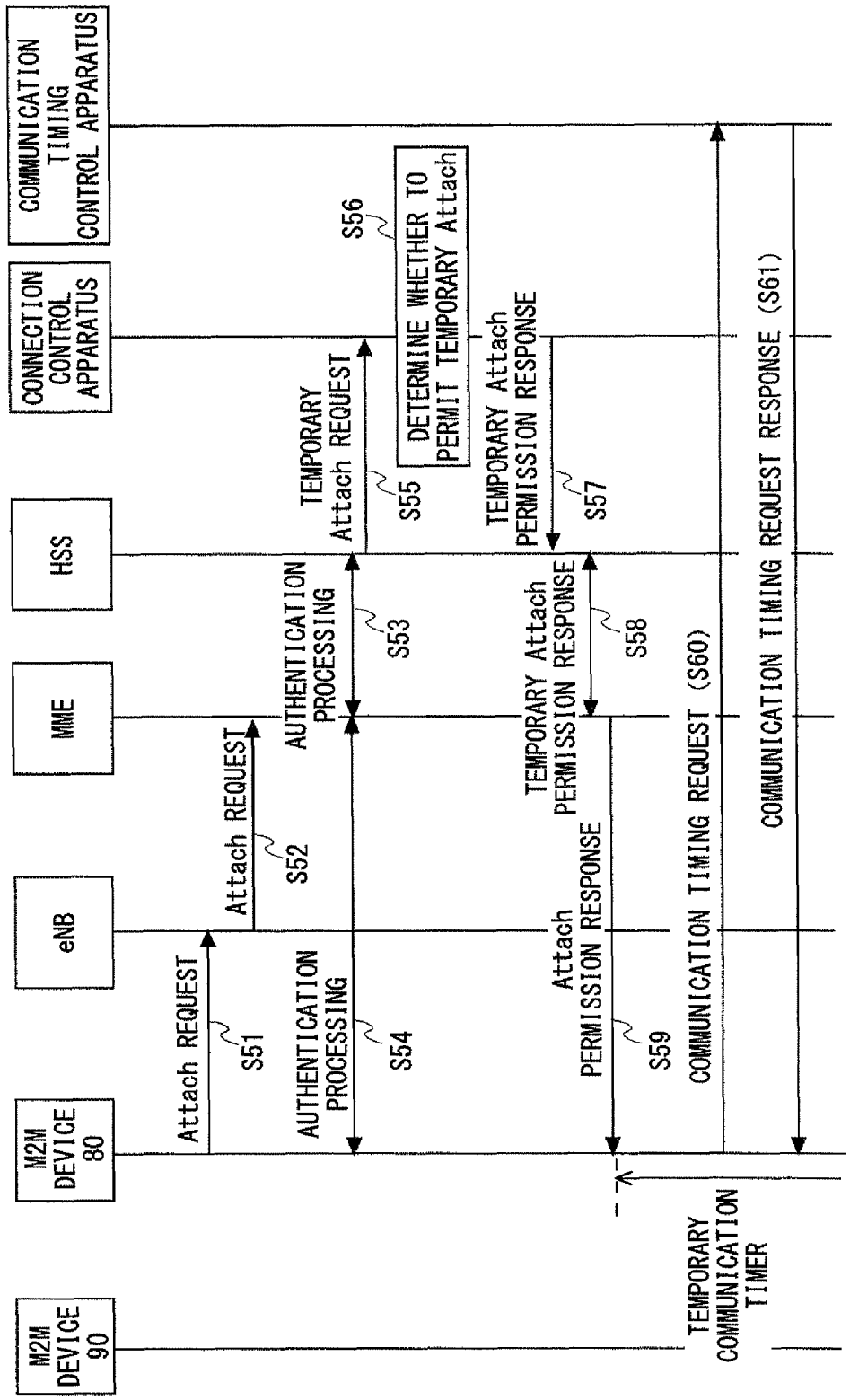
FIG. 7 is a view showing a flow of processing for connecting an M2M device to a 3G core network according to a fourth exemplary embodiment.

Referring next to FIG. 7, a flow of processing for connecting the M2M device 80 to the 3G core network 42 according to a fourth exemplary embodiment of the present invention will be described. First, the M2M device 80 transmits the Attach request message to the eNodeB 50 (it is shown by eNB in FIG. 7) (S51). The M2M device 80 transmits the Attach request message to the eNodeB 50 to be connected to the 3G core network 42 when, for example, a power is turned on. While the M2M device 80 has transmitted the temporary Attach request message including the temporary communication flag to the eNodeB 50 in FIG. 5, the Attach request message that does not include the temporary communication flag is transmitted in FIG. 7.

Next, the eNodeB 50 transmits the Attach request message transmitted to it from the M2M device 80 to the MME 60 (S52). Next, when the Attach request message is transmitted to the MME 60 from the eNodeB 50, authentication processing is performed between the M2M device 80 and the HSS 70. Specifically, the HSS 70 communicates the message regarding the authentication processing with the M2M device 80 through the MME 60 (S53, S54). The authentication processing in Steps S53 and S54 is similar to the authentication processing in Steps S13 and S14 shown in FIG. 5.

Next, upon completion of the authentication processing of the M2M device 80 in Steps S53 and S54, the HSS 70 transmits the temporary Attach request message to the connection control apparatus 20 (S55). The HSS 70 transmits the temporary Attach request message to the connection control apparatus 20 to check whether the Attach request message transmitted from the M2M device 80 corresponds to the message that requests the temporary communication (S55). Next, upon receiving the temporary Attach request message, the connection control apparatus 20 determines whether the temporary Attach request message transmitted from the M2M device 80 corresponds to the message that requests the temporary communication (S56). The connection control apparatus 20 may determine whether the Attach request message transmitted from the M2M device 80 corresponds to the message that requests the temporary communication according to the transmission history of the Attach request message transmitted from the M2M device 80.

When a predetermined period of time has not yet passed since the Attach request message had been transmitted from the same M2M device 80 before, for example, the connection control apparatus 20 may determine that the Attach request message transmitted in Steps S51 does not correspond to the message that requests the temporary communication. That is, when a predetermined period of time has passed since the Attach request message had been transmitted from the same M2M device 80 before, the connection control apparatus 20 may determine that the Attach request message transmitted in Steps S51 corresponds to the message that requests the temporary communication.

Alternatively, the connection control apparatus 20 may manage a timer for each M2M device to determine whether a predetermined period of time has passed since the Attach request message had been transmitted from the same M2M device before. Specifically, the connection control apparatus 20 may manage the information on the time when the Attach request message was received before for each M2M device. Alternatively, the connection control apparatus 20 may manage elapsed time information from the reception of the previous Attach request message to the present for each M2M device.

Further, the connection control apparatus 20 may determine that the Attach request message that has first been transmitted after the elapse of a predetermined time corresponds to the message that requests the temporary communication.

Next, when it is determined that the Attach request message transmitted in Steps S51 corresponds to the message that requests the temporary communication, the connection control apparatus 20 transmits the temporary Attach permission response message to the HSS 70 (S57). Next, the HSS 70 transmits the temporary Attach permission response message transmitted from the connection control apparatus 20 to the MME 60 (S58). Next, the MME 60 transmits the Attach permission response message to the M2M device 80 as the response message for Steps S52 (S59).

When the M2M device 80 receives the Attach permission response message in the state in which the M2M device 80 has not yet received a notification of the communication time for exchanging the user data or the like or the timing at which the M2M device 80 is to be attached to the 3G core network 42 to exchange the user data or the like from the communication timing control apparatus 30, the M2M device 80 starts the temporary communication timer. The information regarding the period during which the temporary communication timer is being activated is set in the Attach permission response message.

Alternatively, when the M2M device 80 finds information indicating that the temporary communication will be allowed (e.g., information on the temporary communication timer or the temporary communication permission flag) in the Attach permission response message, the M2M device 80 may start the temporary communication timer.

Since Steps S60 and S61 are similar to Steps S20 and S21 in FIG. 5, the detailed descriptions will be omitted.

As described above, the M2M device 80 shown in FIG. 7 transmits the normal Attach request in which the temporary communication flag is not set. Whether the M2M device 80 requests the temporary communication can be determined by the connection control apparatus 20. Therefore, the M2M device 80 is able to use the Attach request message which is the existing message when the temporary communication is performed. Therefore, there is no need to newly perform settings to perform the temporary communication.

(Fifth Exemplary Embodiment)

Next, with reference to FIG. 8, a flow of communication processing with a neighboring M2M device executed when the M2M device has been started according to a fifth exemplary embodiment of the present invention will be described. It is assumed in FIG. 8 that a representative M2M device acquires the communication timing of another M2M device in the asynchronous communication group instead of each M2M device that belongs to the asynchronous communication group acquiring the communication timing from the communication timing communication apparatus 30.

First, the M2M device 90 is started by a user who has pressed, for example, a power supply switch (S71). Next, the M2M device 90 starts a representative timer immediately after the start of the M2M device 90 (S72). The representative timer is a timer used to determine the representative M2M device from among the plurality of M2M devices that belong to the asynchronous communication group. Next, the M2M device 90 transmits a neighbor investigation message to the neighboring M2M device while the representative timer is being activated (S73). The M2M device 90 may transmit the neighbor investigation message to an arbitrary neighboring M2M device without designating the destination. That is, the M2M device 90 may transmit the neighbor investigation message to the neighboring M2M device as a broadcast message. Alternatively, when the M2M device 90 includes information on the M2M device in the asynchronous communication group, it may designate the M2M device in the asynchronous communication group as a destination and transmit the neighbor investigation message to each M2M device.

When there is no M2M device that is being activated in the vicinity of the M2M device 90, the M2M device 90 does not receive a response message in response to the neighbor investigation message. Next, the M2M device 90 stops the representative timer after a predetermined time has passed (S74). Since the M2M device 90 has not received the response message from another M2M device in response to the neighbor investigation message, the M2M device 90 operates as the representative M2M device in the asynchronous communication group.

Next, the M2M device 90, which is the representative M2M device, starts a participation accept timer (S75). It is assumed here that the M2M device 80 has been started (S76) and the representative timer has been started (S77). The M2M device 80 is the M2M device that belongs to the asynchronous communication group that is the same as the group to which the M2M device 90 belongs. At this time, the M2M device 80 transmits the neighbor investigation message to the neighboring M2M device (S78).

Next, when the M2M device 90 receives the neighbor investigation message transmitted from the neighboring M2M device while the participation accept timer is being activated, the M2M device 90 transmits a representative information notification message to the M2M device 80 to notify the M2M device 80 that the M2M device 90 is the representative M2M device (S79).

Next, when the M2M device 80 receives the representative information notification message transmitted to it from the M2M device 90 as the response message in response to the neighbor investigation message while the representative timer is being activated, the M2M device 80 determines that the M2M device 80 is not the representative M2M device and forcibly stops the representative timer (S80).

Next, after the M2M device 90 starts the participation accept timer in Step S75, it stops the participation accept timer after a predetermined time has passed (S81).

Even when the M2M device 80 has been started and the neighbor investigation has been carried out before the expiration of the representative timer of the M2M device 90, processing similar to that in Steps S78 and S79 may be performed and the M2M device 90 may become a representative. That is, in this case, the M2M device 90 becomes a representative since it is the terminal that has performed the neighbor investigation for the first time before the representative timer expires.

Figure 8:
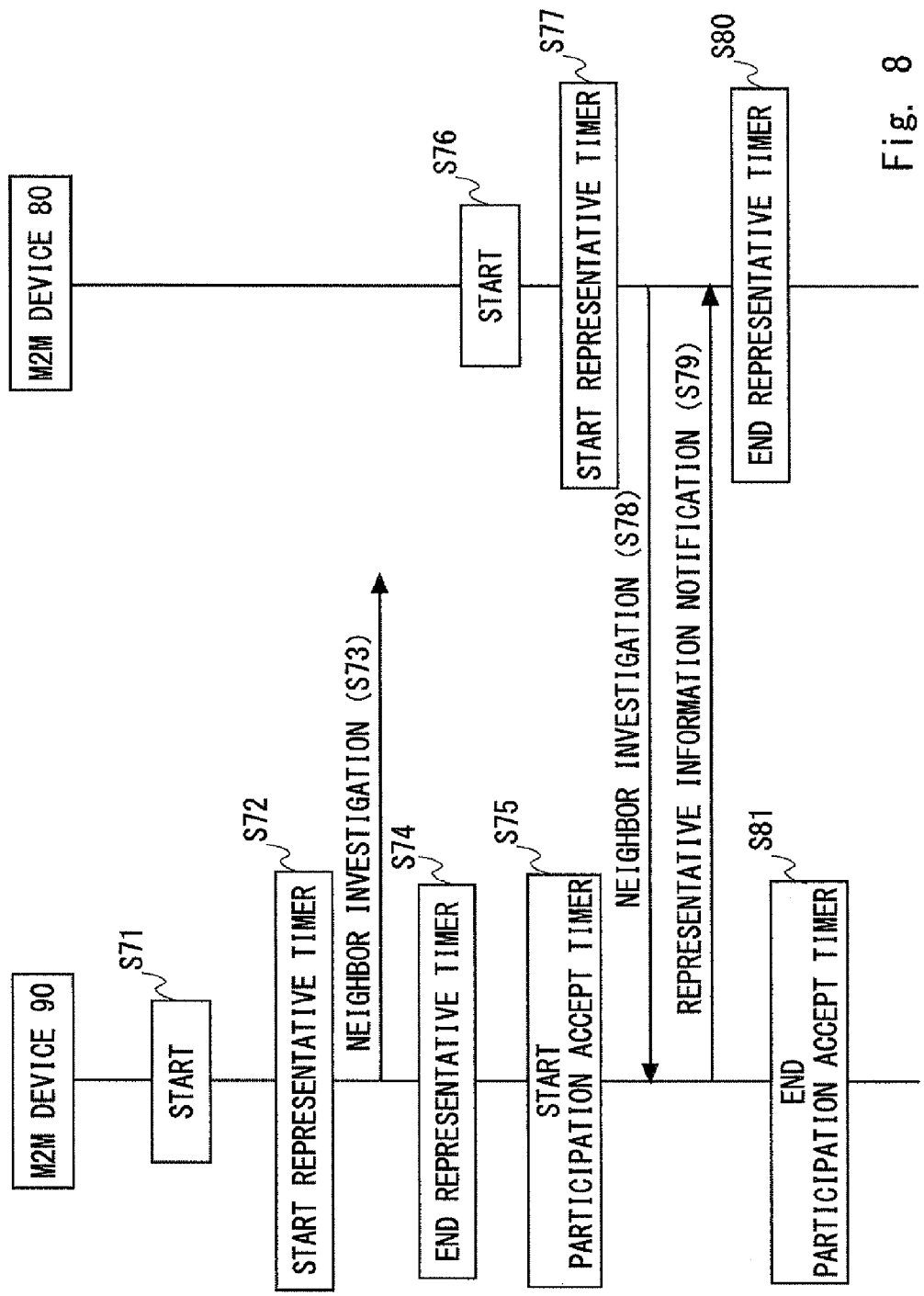
FIG. 8 is a view showing a flow of processing for communicating with a neighboring M2M device executed when an M2M device is activated according to a fifth exemplary embodiment.

Further, the method for determining the representative is not limited to the method shown in FIG. 8 and an arbitrary method may instead be used. The representative may be determined, for example, by exchanging information on a representative priority between M2M devices (information indicating whether one device can preferentially become the representative according to the specification of the device or the type of the service). Specifically, when one M2M device has received from another M2M device the information indicating that the other M2M device has a higher priority than the M2M device does as a response as a result of performing the neighbor investigation after the activation, the other M2M device becomes the representative. On the other hand, when it is revealed as the result of the neighbor investigation that one device has the highest priority, this device becomes the representative. Further, when the neighbor investigation message is received from an M2M device having a priority higher than the other M2M device after this device becomes the representative based on the exchange of the priority information, this device gives a right to become a representative to the M2M device that has transmitted the neighbor investigation message. In another example, the representative may be randomly determined by exchanging information between the M2M devices that have been activated within a predetermined period. Specifically, it is selected in each M2M device whether each M2M device becomes the representative using a random number. After the representative is determined, the result of selecting the representative is exchanged between the M2M devices to determine whether the representative has been determined. If the representative is duplicated or no representative is selected, the random selection operation is repeated until the representative is determined.

Further, in any method for determining the representative, the number of representative M2M devices is not limited to one and a plurality of M2M devices may instead be selected. The number of M2M devices may correspond to or not correspond to the number of devices that can perform synchronous communication allowed in the asynchronous communication group.

As described above, since the M2M devices perform communication with one another, it is possible to determine the representative M2M device from among the plurality of M2M devices that belong to the asynchronous communication group. In the following processing, the M2M device 90 acquires from the communication timing control apparatus 30 the communication timing of the M2M device 80 in addition to the communication timing of the M2M device 90 as the representative M2M device.

Wireless LAN communication may be used as the communication between the M2M device 90 and the M2M device 80. Alternatively, near-field communication such as infrared communication, Bluetooth (registered trademark), or Zigbee (registered trademark) may be used as the communication between the M2M device 90 and the M2M device 80.

Figure 9:
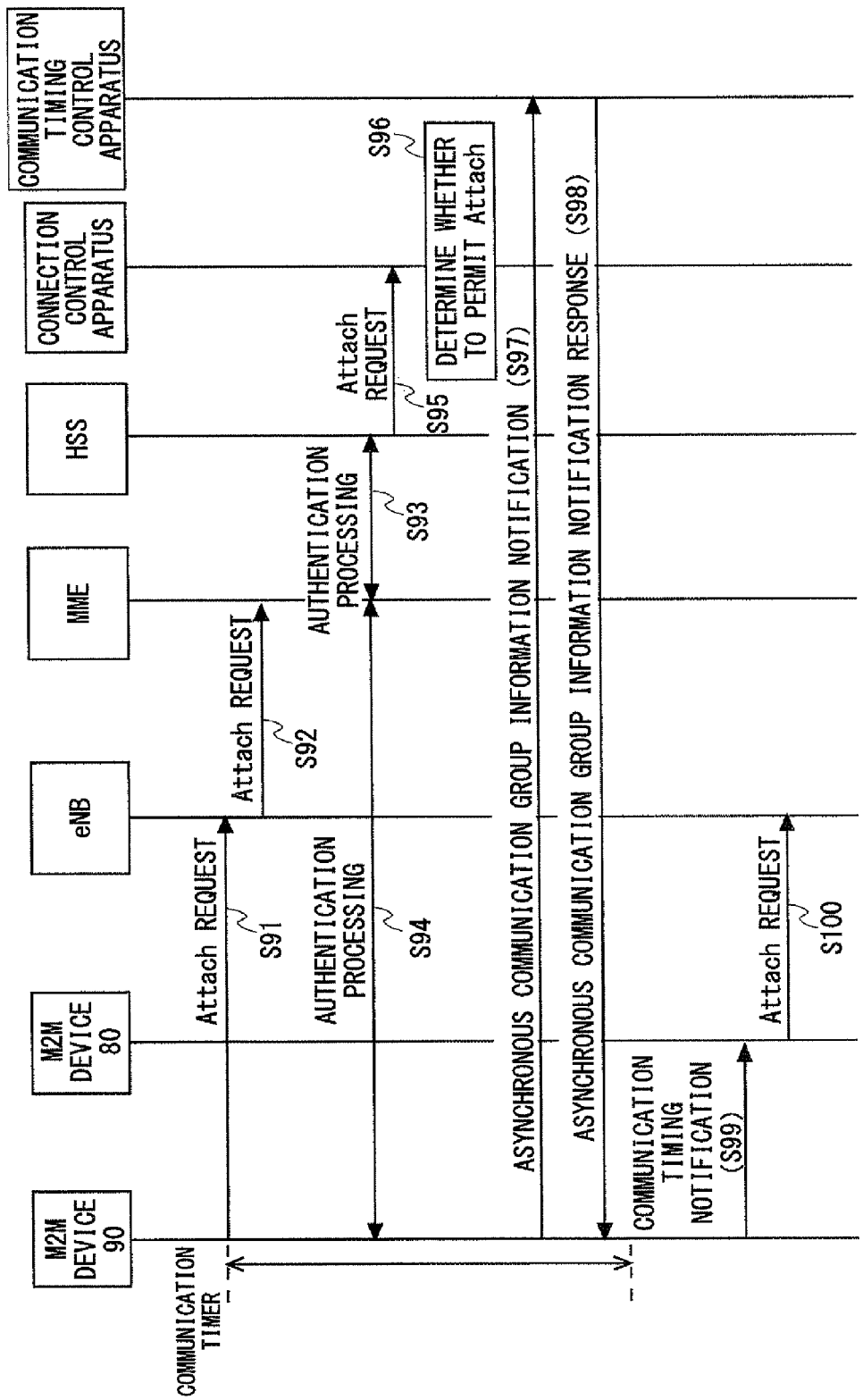
FIG. 9 is a view showing a flow of processing for acquiring a communication timing according to the fifth exemplary embodiment.

Next, with reference to FIG. 9, a flow of processing for acquiring the communication timing according to the fifth exemplary embodiment of the present invention will be described. In FIG. 9, it is assumed that the processing shown in FIG. 8 has been executed and the M2M device 90 is the representative M2M device.

First, the M2M device 90 transmits the Attach request message to the eNodeB 50 to be connected to the 3G core network 42 (S91). Further, the M2M device 90 transmits the Attach request message and starts the communication timer. Since Steps S92-S96 are similar to Steps S52-S54 in FIG. 7 in the following description, the detailed descriptions thereof will be omitted.

Next, the HSS 70 transmits the Attach request message to the connection control apparatus 20 after the authentication processing regarding the M2M device 90 has been completed (S95). Next, the connection control apparatus 20 determines whether it is possible to accept the Attach of the M2M device 90 (S96). The connection control apparatus 20 determines that it is possible to accept the Attach of the M2M device 90 when another M2M device in the asynchronous communication group to which the M2M device 90 belongs is not connected to the 3G core network 42. Otherwise, the connection control apparatus 20 may determine whether the Attach request message transmitted from the M2M device 90 corresponds to the message that requests the temporary communication in Steps S96. The connection control apparatus 20 determines that it is impossible to accept the Attach of the M2M device 90 when another M2M device in the asynchronous communication group to which the M2M device 90 belongs is connected to the 3G core network 42. When it is determined in Step S96 that it is possible to accept the Attach of the M2M device 90, the connection control apparatus 20 may explicitly notify the M2M device 90 of the determination result or may not notify the M2M device 90 of the determination result.

Next, when the M2M device 90 is connected to the 3G core network 42 and becomes the Attach state, it transmits an asynchronous communication group information notification message to the communication timing control apparatus 30 (S97). The M2M device 90 sets that the M2M device 90 and the M2M device 80 exist within the asynchronous communication group and then transmits the asynchronous communication group information notification message to the communication timing control apparatus 30 (S97).

Next, the communication timing control apparatus 30 transmits an asynchronous communication group information notification response message to the M2M device 90 as a response message in response to the asynchronous communication group information notification message (S98). The communication timing control apparatus 30 sets the communication timings of the M2M device 80 and the M2M device 90 to transmit the asynchronous communication group information notification response message to the M2M device 90.

The M2M device 90 stops the communication timer after receiving the asynchronous communication group information notification response message. Further, the M2M device 90 stops the communication timer and is detached from the 3G core network 42 to make a transition to the Detach state. The M2M device 90 may stop the communication timer upon receiving the asynchronous communication group information notification response message or may stop the communication timer when a predetermined period of time has passed since the start of the communication timer. When the M2M device 90 stops the communication timer when a predetermined period of time has passed since the start of the communication timer, the M2M device 90 sets a time that is longer than the estimated time until the reception of the asynchronous communication group information notification response message after the transmission of the Attach request to start the communication timer.

Further, the M2M device 90 may continue (extend) the current Attach state according to the communication timing included in the asynchronous communication group information notification response message that has been received.

Next, the M2M device 90 transmits the communication timing notification message to the M2M device 80 (S99). The communication timing notification message is used to notify the M2M device 80 of the communication timing of the M2M device 80 set in the asynchronous communication group information notification response message.

The M2M device 90 may transmit the communication timing notification message to the M2M device 80 in the Attach state when the M2M device 90 is kept to be in the Attach state.

Next, the M2M device 80 transmits the Attach request message to the eNodeB 50 based on the communication timing that is set in the communication timing notification (S100).

As described above, in the communication according to the fifth exemplary embodiment of the present invention, the representative M2M device from among the plurality of M2M devices that belong to the asynchronous communication group acquires from the communication timing control apparatus 30 the communication timing of the representative M2M device and the communication timings of the other M2M devices.

The communication timing control apparatus 30 is therefore able to collectively calculate the communication timings of the plurality of M2M devices all at once instead of receiving the communication timing request for each of the plurality of M2M devices that belong to the asynchronous communication group to calculate the communication timings. The communication timing control apparatus 30 is therefore able to efficiently calculate the communication timing of each M2M device. Further, the number of times that the message is transmitted from the M2M device for the purpose of acquiring the communication timing decreases, whereby the processing load of the communication timing control apparatus 30 is also reduced.

Further, the representative M2M device makes an inquiry about the communication timings of the other M2M devices, whereby it is possible to reduce the amount of communication in the 3G core network.

(Sixth Exemplary Embodiment)

Figure 10:
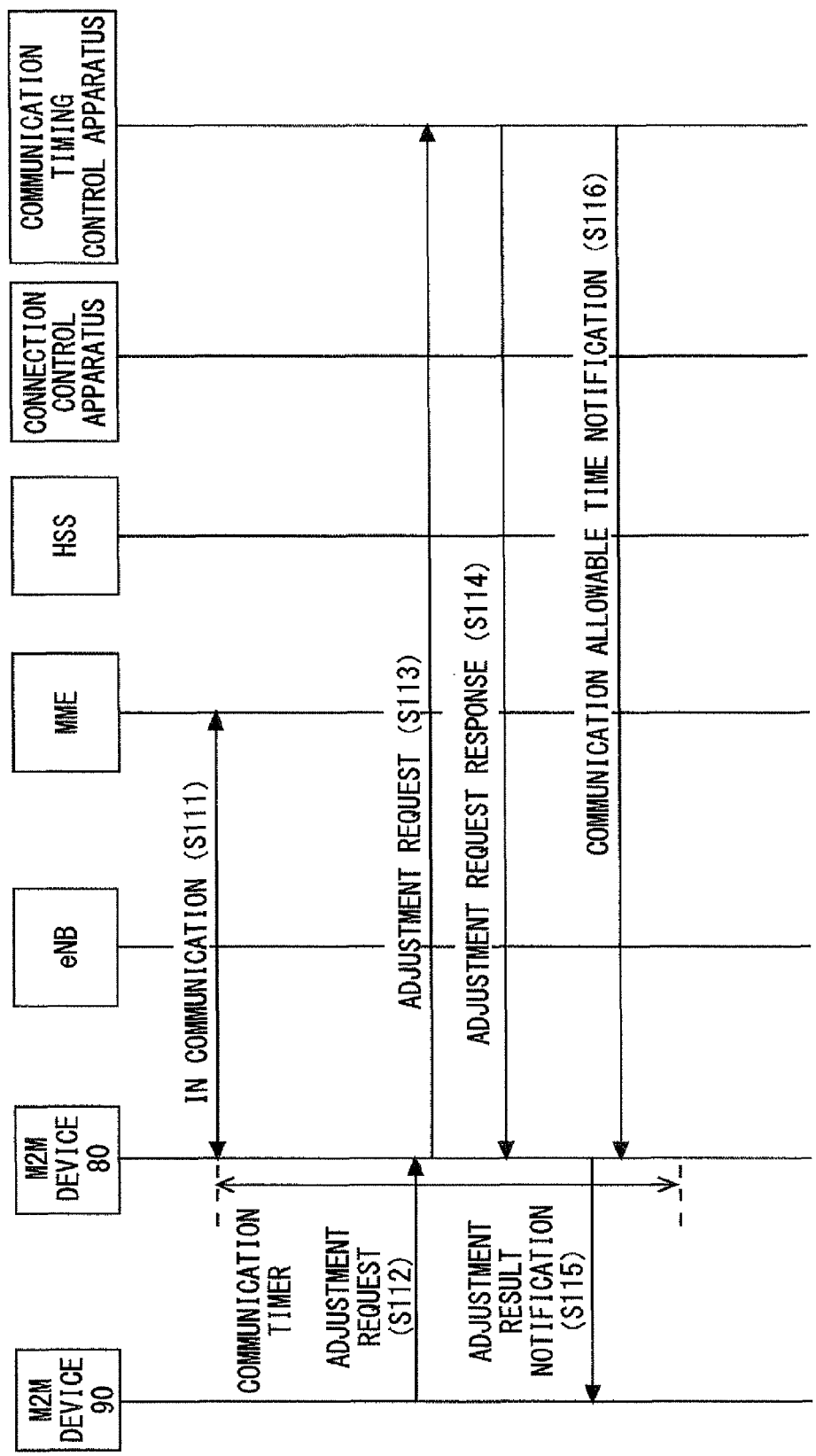
FIG. 10 is a view showing a flow of processing for acquiring a communication timing according to a sixth exemplary embodiment.

Referring next to FIG. 10, a flow of processing for acquiring communication timings according to a sixth exemplary embodiment of the present invention will be described. It is assumed that the M2M device 80 shown in FIG. 10 is executing the processing shown in FIG. 5. That is, a case is assumed that the M2M device 80 has acquired the communication timing from the communication timing control apparatus 30 and is in the middle of performing communication using the 3G core network 42 based on the communication timing that has been acquired (S111).

The M2M device 80 also acquires information regarding the communication time when acquiring the communication timing from the communication timing control apparatus 30. Therefore, the M2M device 80 starts the communication timer based on the communication time acquired from the communication timing control apparatus 30.

Next, when the power of the M2M device 90 has been turned on and the M2M device 90 has been started or it is determined that the M2M device 90 which is in the Detach state although it is being activated requires an adjustment of the communication timing due to an event (e.g., when there is urgent data that should be immediately transmitted or no further communications will be necessary for a while), the M2M device 90 transmits an adjustment request message to the M2M device 80 which is in the Attach state (S112). The adjustment request message is a message that is used when the M2M device which is in the non-Attach state acquires the communication timing via the M2M device which is in the Attach state.

When the power of the M2M device 90 has been turned on and the M2M device 90 has been started, the adjustment request message may be transmitted after the M2M device 80 which is currently in the Attach state has been found as a result of the neighborhood investigation, similar to the processing shown in FIG. 8. In this case, the M2M device 80 which is currently in the Attach state sends a response indicating that the M2M device 80 is in the Attach state in response to the neighbor investigation from the M2M device 90.

Wireless LAN communication may be used as the communication between the M2M device 90 and the M2M device 80. Alternatively, near-field communication such as infrared communication, Bluetooth (registered trademark), or Zigbee (registered trademark) may be used as the communication between the M2M device 90 and the M2M device 80.

Next, the M2M device 80 transmits the adjustment request message to the communication timing control apparatus 30 (S113). The M2M device 80 sets the identification information of the M2M device 90 in the adjustment request message to transmit this message to the communication timing control apparatus 30. Next, upon receiving the adjustment request message, the communication timing control apparatus 30 transmits an adjustment request response message to the M2M device 80 as a response message (S114). The communication timing control apparatus 30 sets the communication timing of the M2M device 90 to transmit the adjustment request response message to the M2M device 80.

Next, the M2M device 80 transmits an adjustment result notification message to the M2M device 90 (S115). The M2M device 80 sets the communication timing of the M2M device 90 set in the adjustment request response message to transmit the adjustment result notification message to the M2M device 90.

Next, the communication timing control apparatus 30 updates the communication time allocated to the M2M device 80, sets the communication time that has been updated, and transmits a communication allowable time notification message to the M2M device 80 (S116). Assume, for example, that when the communication of the M2M device 90 is urgently needed, the communication timing control apparatus 30 determines that the communication opportunity is given to the M2M device 90 at an earlier timing. In such a case, the communication timing control apparatus 30 is able to give the earlier communication opportunity to the M2M device 90 by reducing the communication time allocated to the M2M device 80. Therefore, the communication timing control apparatus 30 may update the communication time to reduce the communication time and transmit the communication allowable time notification message to the M2M device 80 to notify the M2M device 80 of the communication time that has been reduced.

Otherwise, when the communication of the M2M device 90 is not urgent, the communication timing control apparatus 30 may determine that the timing for giving the communication opportunity to the M2M device 90 should be delayed. In such a case, the communication timing control apparatus 30 may extend the communication time allocated to the M2M device 80. Therefore, the communication timing control apparatus 30 may update the communication time to extend the communication time and send the communication allowable time notification message to the M2M device 80 to notify the M2M device 80 of the communication time that has been extended.

The M2M device 80 stops the communication timer or extends the start time of the communication timer based on the communication time that has been updated. The M2M device 80 executes processing for stopping the communication timer and being detached from the 3G core network 42 to be in the Detach state.

The M2M device 90 is connected to the 3G core network 42 based on the communication timing regarding which a notification has been sent from the M2M device 80 to be in the Attach state.

As described above, by executing the processing in FIG. 10, the M2M device which is in the non-Attach state is able to acquire the communication timing through the M2M device which is in the Attach state. Therefore, it is possible to reduce the amount of communication in the 3G core network 42 compared to that in FIG. 6 when the M2M device 90 is started.

Further, it is possible to request the adjustment of the communication timing even when the M2M device is in the non-Attach state, whereby it is possible to provide the communication time determined to be unnecessary for the M2M device for other M2M devices in the asynchronous communication group. Furthermore, in case of emergency, it is possible to obtain an earlier Attach timing by requesting it without waiting for the communication timing (Attach timing) that is to be allocated.

(Seventh Exemplary Embodiment)

Figure 11:
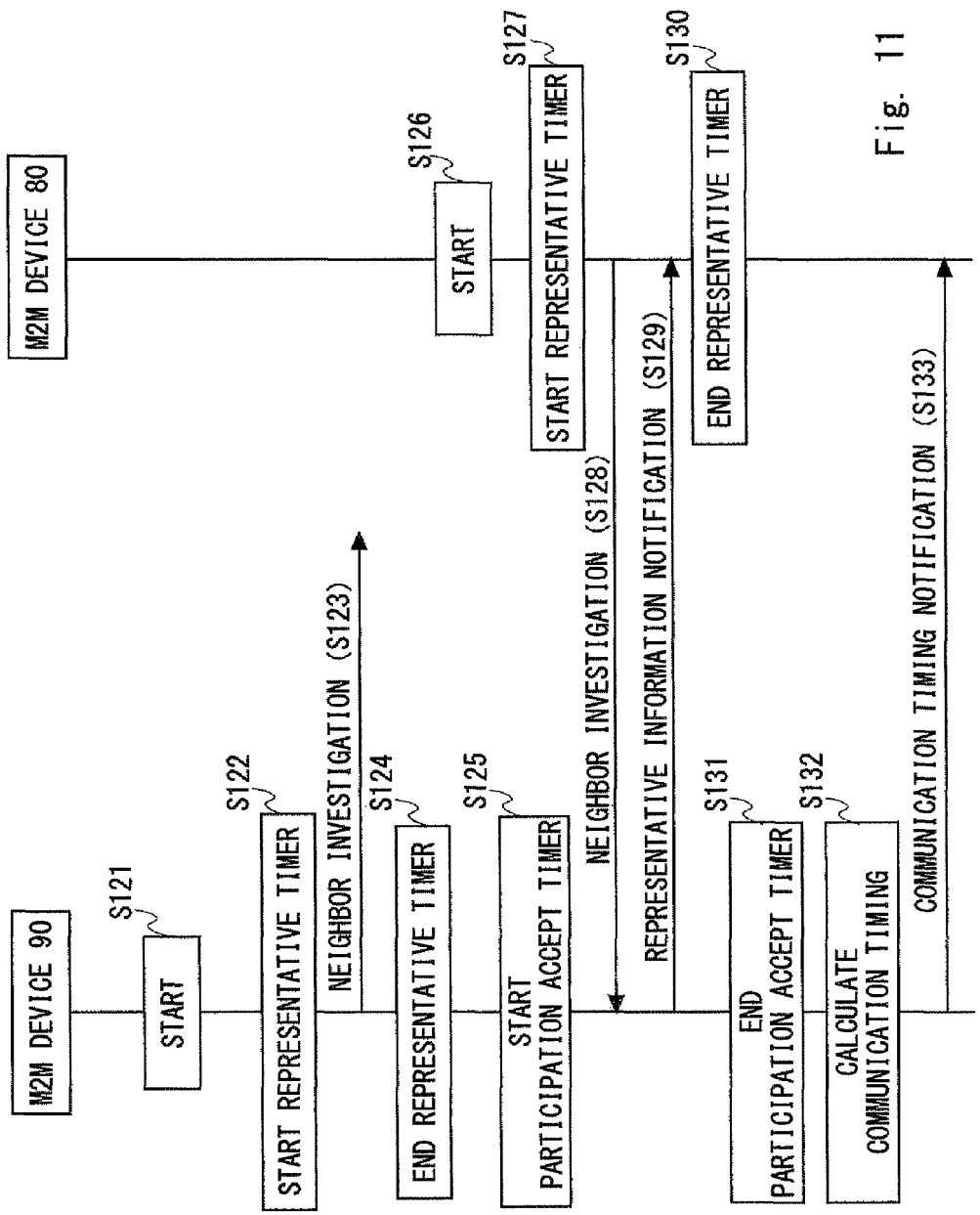
FIG. 11 is a view showing a flow of processing for sending a notification of a communication timing according to a seventh exemplary embodiment.

Referring next to FIG. 11, a flow of processing for sending a notification of communication timings according to a seventh exemplary embodiment of the present invention will be described. Since Steps S121-S131 are similar to Steps S71-S81 shown in FIG. 8, the detailed descriptions will be omitted.

The M2M device 90 is a representative M2M device in the asynchronous communication group and ends the participation accept timer in Steps S131. The M2M device 90 calculates the timing of the communication between the M2M device 80 started while the participation accept timer is being activated and the M2M device 90 (S132).

Next, the M2M device 90 transmits the communication timing notification message to the M2M device 80 (S133). The M2M device 90 transmits the communication timing notification message to the M2M device 80 to notify the M2M device 80 of the communication timing of the M2M device 80 calculated in Step S132.

The M2M device 90 is connected to the 3G core network 42 based on the communication timing that has been calculated. Further, the M2M device 80 is connected to the 3G core network 42 based on the communication timing regarding which a notification has been sent from the M2M device 90.

In order to calculate the communication timings according to the asynchronous communication group information and the subscriber information managed by the connection control apparatus 20, the HSS 70 or the like of the 3G core network, the M2M devices may exchange the subscriber identifier (subscriber information) and the asynchronous communication group information. Instead of exchanging the asynchronous communication group information and the subscriber identifier regarding the 3G core contract, the M2M devices may exchange service group information or service terminal identification for services associated with the asynchronous communication group information or the subscriber identifier related to the 3G core contact in advance.

Further, the adjustment of the communication timings between the M2M devices may be executed by a method other than the method shown in FIG. 11 in which the representative is selected. The adjustment of the communication timings between the M2M devices may be executed by a method in which no representative is selected. For example, a method for slotting the Attach timing and the communication time in the time-division system and contending for slots to be acquired randomly or on a first-come-first-served basis may be used. In this case, the autonomous control is performed so as to prevent a state in which a plurality of devices are in the Attach state by exchanging the information on the slots to be acquired between the devices.

As described above, by using the flow of the processing for sending a notification of the communication timing in FIG. 11, the M2M device is able to calculate the communication timings of the plurality of M2M devices that belong to the asynchronous communication group. Therefore, the M2M device needs not transmit messages to the 3G core network 42 to acquire the communication timing. It is therefore possible to reduce the amount of communication in the 3G core network 42.

Further, even when the communication timing control apparatus 30 is not used, it is possible to control the communication timing of each M2M device, whereby it is possible to reduce the cost for constructing the communication system.

Further, even when the communication timing control apparatus 30 is not used, it is possible to control the communication timing of each M2M device, which means there is no need to consider any faults in the communication timing control apparatus 30. It is therefore possible to improve the fault tolerance of the whole communication system.

(Eighth Exemplary Embodiment)

Referring next to FIG. 12, a flow of processing for sending a notification of communication timings according to an eighth exemplary embodiment of the present invention will be described. Since Steps S141 and S142 are similar to Steps S111 and S112 in FIG. 10, the detailed descriptions will be omitted.

Upon receiving the adjustment request message transmitted from the M2M device 90 in Step S142, the M2M device 80 calculates the communication timing of the M2M device 90 (S143). Further, the M2M device 80 may calculate the communication timing of the M2M device 90 and perform re-calculation regarding whether to reduce or extend the communication time of the M2M device 80. Next, the M2M device 80 transmits the adjustment result notification message to the M2M device 90 to notify the M2M device 90 of the communication timing of the M2M device 90 that has been calculated (S144).

Alternatively, when the adjustment method in which the M2M devices contend with each other for the communication timing without selecting the representative is employed, a notification of the communication timing which will be acquired by the M2M device 90 may be sent in S142 in FIG. 12. In this case, the M2M device 80 transmits a response for acknowledging that the M2M device 90 acquires the timing that has been notified, a response for requesting a re-adjustment, a response for sending a notification that the M2M device 80 has already acquired the communication timing or the like.

In any method for adjusting the communication timing, the transmission and the reception of the message regarding the adjustment between the M2M devices may be performed a plurality of times.

As described above, when the M2M device 80 which is in the Attach state has received the adjustment request message for the purpose of acquiring the communication timing from the M2M device 90 which is in the non-Attach state, the M2M device 80 is able to calculate the communication timing of the M2M device 90 instead of acquiring the communication timing from the communication timing control apparatus 30. Therefore, the M2M device needs not transmit messages to the 3G core network 42 to acquire the communication timing. It is therefore possible to reduce the amount of communication in the 3G core network 42.

Further, since it is possible to control the communication timing of each M2M device without using the communication timing control apparatus 30, it is possible to reduce the cost for constructing the communication system.

Further, since it is possible to control the communication timing of each M2M device without using the communication timing control apparatus 30, there is no need to consider any fault in the communication timing control apparatus 30. It is therefore possible to improve the fault tolerance of the whole communication system.

While the present invention has been described as a hardware configuration in the exemplary embodiments stated above, the present invention is not limited to the hardware configuration. The present invention may achieve the processing of the connection control apparatus and the communication timing control apparatus by causing a central processing unit (CPU) to execute a computer program.

In the above examples, the program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present invention is not limited to the exemplary embodiments stated above and may be changed as appropriate without departing from the spirit of the present invention.

While the present invention has been described with reference to the exemplary embodiments above, the present invention is not limited to the exemplary embodiments stated above. Various changes that can be understood by those skilled in the art may be made on the configurations and the details of the present invention within the scope of the present invention.

This application is based upon and claims the benefit of priority from Japanese Patent Application No. 2013-103218, filed on May 15, 2013, the disclosure of which is incorporated herein in its entirety by reference.

REFERENCE SIGNS LIST

10 COMMUNICATION APPARATUS
20 CONNECTION CONTROL APPARATUS
21 CONTROLLER
22 COMMUNICATION UNIT
30 COMMUNICATION TIMING CONTROL APPARATUS
31 TIMER MANAGEMENT UNIT
32 TIMING CONTROLLER
33 COMMUNICATION UNIT
40 NETWORK
42 3G CORE NETWORK
50 eNodeB
60 MME
70 HSS
80 M2M DEVICE
90 M2M DEVICE

The invention claimed is:
1. A communication system comprising:
a connection control apparatus configured to receive a connection request message that requests a connection to a network from a first communication apparatus from among a plurality of communication apparatuses in which a synchronous communication is limited and to allow the first communication apparatus to be temporarily connected to the network for a predetermined period of time in response to the connection request message corresponding to a message that requests a temporary communication; and a communication timing control apparatus comprising:
   a communication unit configured to transmit a communication allowable timing notification message indicating a first communication timing to the first communication apparatus while the first communication apparatus is allowed to be temporarily connected to the network,
      wherein the communication timing control apparatus transmits the communication allowable timing notification message in response to receiving a first communication timing request message that requests acquisition of the first communication timing from the first communication apparatus;
   a timer management unit configured to start a collective accept timer in response to receiving the first communication timing request message; and
   a communication timing calculating unit configured to, in response to receiving a second communication timing request message from a second communication apparatus from among the plurality of communication apparatuses while the accept timer is being activated:
      calculate a second communication timing of the second communication apparatus, and
      update the first communication timing of the first communication apparatus.

2. The communication system according to claim 1, wherein the temporary communication is a communication that the first communication apparatus performs to acquire a predetermined communication parameter from the network.

3. The communication system according to claim 1, wherein the connection control apparatus is configured to determine, in response to the connection control apparatus receiving the connection request message in which a temporary communication flag is set from the first communication apparatus, that the connection request message corresponds to the message that requests the temporary communication.

4. The communication system according to claim 1, wherein the connection control apparatus is configured to determine, according to a timing at which the connection request message is received from the first communication apparatus, whether the connection request message corresponds to the message that requests the temporary communication.

5. The communication system according to claim 4, wherein the connection control apparatus is configured to determine, according to whether a second predetermined period of time has passed since the connection request message transmitted from the first communication apparatus was received, whether the connection request message corresponds to the message that requests the temporary communication.

6. The communication system according to claim 4, wherein the connection control apparatus is configured to determine, in response to the connection control apparatus receiving the connection request message that has been transmitted from the first communication apparatus after a second predetermined period of time, that the connection request message corresponds to the message that requests the temporary communication.

7. The communication system according to claim 1, wherein the communication timing control apparatus is configured to transmit the communication allowable timing notification message indicating a communication timing of a representative communication apparatus from among the plurality of communication apparatuses and a communication timing of another communication apparatus from among the plurality of communication apparatuses to the representative communication apparatus.

8. The communication system according to claim 1, wherein the communication timing control apparatus is configured to notify, in response to a communication timing request message that requests acquisition of a third communication timing of a third communication apparatus from among the plurality of communication apparatuses being received from the first communication apparatus, the first communication apparatus of the third communication timing of the third communication apparatus.

9. A communication apparatus comprising:
   at least one processor configured to execute:
      a control unit configured to send a connection request message, from the communication apparatus to a connection control apparatus,
         wherein the connection request message requests a temporary connection to a network for a first predetermined period of time,
         wherein the control unit is configured to determine communication timings of the communication apparatus and another communication apparatus, and
         wherein the communication apparatus and the another communication apparatus are from among a plurality of communication apparatuses in which a synchronous communication to the network is limited; and
      a communication unit configured to notify the another communication apparatus of the communication timing of the another communication apparatus,
      wherein the communication apparatus is configured to transmit a message for notifying the another communication apparatus of a start of the communication apparatus at the time of the start of the communication apparatus, and
      wherein the communication apparatus is configured to, in response to not receiving a response message in response to the message for notifying the another communication apparatus of the start of the communication apparatus within a second Predetermined period of time, operate as a representative communication apparatus.

10. The communication apparatus according to claim 9, wherein:
   the communication unit is configured to transmit the message for notifying the another communication apparatus of the start of the communication apparatus at the time of the start of the communication apparatus, and
   the control unit is configured to:
   in response to the communication apparatus not receiving, from the another communication apparatus, the response message in response to the message for notifying the another communication apparatus of the start of the communication apparatus within the second predetermined period of time, determine the communication timing of the another communication apparatus within a third predetermined period of time.

11. The communication apparatus according to claim 9, wherein the communication apparatus is configured to transmit a message including a priority of the communication apparatus to become a representative communication apparatus to the another communication apparatus from among the plurality of communication apparatuses at the time of the start of the communication apparatus and serve as the representative communication apparatus in response to the communication apparatus not receiving from the another communication apparatus a message indicating a priority higher than the priority of the communication apparatus.

12. The communication apparatus according to claim 9, wherein the communication apparatus is configured to randomly select whether the communication apparatus will become a representative communication apparatus at the time of the start of the communication apparatus, and then notify the another communication apparatus of the selection result, and
wherein the communication apparatus is configured to, in response to the communication apparatus not receiving a notification from the another control apparatus indicating that the another communication apparatus will become the representative communication apparatus, serve as the representative communication apparatus in response to the communication apparatus having selected that the communication apparatus will become the representative communication apparatus.

13. A communication timing control apparatus comprising:
at least one processor configured to execute;
a communication unit configured to, in response to a connection control apparatus that monitors a connection state of a plurality of communication apparatuses in which a synchronous communication is limited to a network receiving a connection request message that requests a connection to the network from a first communication apparatus from among the plurality of communication apparatuses in which the synchronous communication is limited, and allowing the first communication apparatus to be temporarily connected to the network for a predetermined period of time in response to the connection request message corresponding to a message that requests a temporary communication:
transmit a communication allowable timing notification message indicating a first communication allowable timing to the first communication apparatus while the first communication apparatus is allowed to be temporarily connected to the network,
wherein the communication unit transmits the communication allowable timing notification message in response to the communication timing control apparatus receiving a first communication timing request message that requests acquisition of the first communication timing from the first communication apparatus;
a timer management unit configured to start a collective accept timer in response to the communication timing control apparatus receiving the first communication timing request message; and
a communication timing calculation unit configured to, in response to the communication timing control apparatus receiving a second communication timing request message from a second communication apparatus from among the plurality of communication apparatuses while the collective accept timer is being activated:
calculate a second communication timing of the second communication apparatus, and
update the first communication timing of the first communication apparatus.

14. The communication timing control apparatus according to claim 13, wherein the communication unit is configured to transmit the communication allowable timing notification message indicating a communication timing of a representative communication apparatus from among a plurality of communication apparatuses in which the synchronous communication is limited and a communication timing of another communication apparatus from among the plurality of communication apparatuses to the representative communication apparatus.

15. The communication timing control apparatus according to claim 13, wherein the communication unit is configured to notify, in response to a third communication timing request message that requests acquisition of a third communication timing of a third communication apparatus from among the plurality of communication apparatuses being received from the first communication apparatus, the first communication apparatus of the third communication timing of the third communication apparatus.

16. A connection control apparatus comprising:
at least one processor configured to execute a control unit configured to;
receive a connection request message that requests a connection to a network
from a first communication apparatus from among a plurality of communication apparatuses in which a synchronous communication is limited,
allow, in response to the connection request message corresponding to a message that requests a temporary communication for receiving a communication timing notification message indicating a communication allowable timing from a communication timing control apparatus, the first communication apparatus to be temporarily connected to the network for a predetermined time period, and
determine, in response to the connection request message in which a temporary communication flag is set being received from the first communication apparatus, that the connection request message corresponds to the message that requests the temporary communication according to a timing at which the connection request message is received from the first communication apparatus.

17. The connection control apparatus according to claim 16, wherein the control unit is configured to determine, according to whether a second predetermined period of time has passed since the connection request message transmitted from the first communication apparatus was received, whether the connection request message corresponds to the message that requests the temporary communication.

18. The connection control apparatus according to claim 16, wherein the control unit is configured to determine, in response to the connection request message that has been transmitted after a second predetermined period of time being received from the first communication apparatus, that the connection request message corresponds to the message that requests the temporary communication.

19. A communication timing control method comprising:
transmitting, in response to a connection control apparatus that monitors a connection state of a plurality of communication apparatuses in which a synchronous communication is limited to a network receiving a connection request message that requests a connection to the network from a first communication apparatus from among the plurality of communication apparatuses in which the synchronous communication is limited, and allowing the first communication apparatus to be temporarily connected to the network for a predetermined period of time in response to the connection request message corresponding to a message that requests a temporary communication, a communication timing notification message indicating a first communication allowable timing to the first communication apparatus and starting a collective accept timer in response to a communication timing request message that requests acquisition of the communication allowable timing being received front the first communication apparatus while the first communication apparatus is allowed to be temporarily connected to the network;

in response to a communication timing request message transmitted from a second communication apparatus from among the plurality of communication apparatuses while the collective accept timer is being activated being received, transmitting the communication timing notification message to the second communication apparatus and updating a communication timing of the first communication apparatus; and transmitting the communication timing notification message indicating the communication timing that has been updated to the first communication apparatus.

20. A connection control method comprising:

receiving a connection request message that requests a connection to a network from a first communication apparatus from among a plurality of communication apparatuses in which a synchronous communication is limited;

in response to the connection request message corresponding to a message that requests a temporary communication for receiving a communication timing notification message indicating a communication allowable timing from a communication timing control apparatus, allowing the first communication apparatus to be temporarily connected to the network for a predetermined period of time; and determining, in response to the connection request message in which a temporary communication flag is set being received from the first communication apparatus, that the connection request message corresponds to the message that requests the temporary communication according to a timing at which the connection request message is received from the first communication apparatus.

21. A non-transitory computer readable medium storing a program for causing a computer to execute operations comprising:

transmitting, in response to a connection control apparatus that monitors a connection state of a plurality of communication apparatuses in which a synchronous communication is limited to a network receiving a connection request message that requests a connection to the network from a first communication apparatus from among the plurality of communication apparatuses in which the synchronous communication is limited and allowing the first communication apparatus to be temporarily connected to the network for a predetermined period of time in response to the connection request message corresponding to a message that requests a temporary communication, a communication timing notification message indicating a first communication allowable timing to the first communication apparatus and starting a collective accept timer in response to a communication timing request message that request acquisition of the communication allowable timing being received from the first communication apparatus while the first communication apparatus is allowed to be temporarily connected to the network;

in response to a communication timing request message transmitted from a second communication apparatus from among the plurality of communication apparatuses while the collective accept timer is being activated being received, transmitting the communication timing notification message to the second communication apparatus and updating a communication timing of the first communication apparatus; and transmitting the communication timing notification message indicating the communication timing that has been updated to the first communication apparatus.

22. A non-transitory computer readable medium storing a program for causing a computer to execute operations comprising:

receiving a connection request message that requests a connection to a network from a first communication apparatus from among a plurality of communication apparatuses in which a synchronous communication is limited; and in response to the connection request message corresponding to a message that requests a temporary communication for receiving a communication timing notification message indicating a communication allowable timing from a communication timing control apparatus, allowing the first communication apparatus to be temporarily connected to the network for a predetermined period of time; and determining, in response to the connection message in which a temporary communication flag is set being received from the first communication apparatus, that the connection request message corresponds to the message that requests the temporary communication according to a timing at which the connection request message is received from the first communication apparatus.

* * * * *

UNITED STATES PATENT AND TRADEMARK OFFICE
CERTIFICATE OF CORRECTION

PATENT NO.        : 9,832,813 B2
APPLICATION NO.   : 14/891183
DATED             : November 28, 2017
INVENTOR(S)       : Takaaki Suzuki and Takanori Iwai It is certified that error appears in the above-identified patent and that said Letters Patent is hereby corrected as shown below:

On the Title Page

Column 1 (71), Line 1:
Before "Tokyo", insert --Minato-ku,--

In the Claims

Column 25, Line 29:
In Claim 1, after "the", insert --collective--

Column 26, Line 51:
"Predetermined" has been replaced with --predetermined--

Column 29, Line 16:
"front" has been replaced with --from--

Column 30, Line 16:
"request" has been replaced with --requests--

Column 30, Line 48:
After "connection" insert --request--

Signed and Sealed this
Thirty-first Day of July, 2018

Andrei Iancu
*Director of the United States Patent and Trademark Office*